(12) United States Patent
Capanema et al.

(10) Patent No.: US 10,793,646 B2
(45) Date of Patent: Oct. 6, 2020

(54) ADHESIVE COMPOSITIONS COMPRISING TYPE-II CELLULOSE

(71) Applicant: RENMATIX, INC., King of Prussia, PA (US)

(72) Inventors: Ewellyn A. Capanema, Wayne, PA (US); Mikhail Y. Balakshin, Wayne, PA (US)

(73) Assignee: Renmatix, Inc., King of Prussia, PA (US)

( * ) Notice: Subject to any disclaimer, the term of this patent is extended or adjusted under 35 U.S.C. 154(b) by 424 days.

(21) Appl. No.: 15/511,195

(22) PCT Filed: Sep. 25, 2015

(86) PCT No.: PCT/US2015/052438
§ 371 (c)(1),
(2) Date: Mar. 14, 2017

(87) PCT Pub. No.: WO2016/049569
PCT Pub. Date: Mar. 31, 2016

(65) Prior Publication Data
US 2017/0275384 A1    Sep. 28, 2017

Related U.S. Application Data

(60) Provisional application No. 62/056,072, filed on Sep. 26, 2014.

(51) Int. Cl.
*C08B 15/08* (2006.01)
*C08B 37/00* (2006.01)
(Continued)

(52) U.S. Cl.
CPC ................ *C08B 15/08* (2013.01); *C07G 1/00* (2013.01); *C08B 11/18* (2013.01); *C08B 15/00* (2013.01);
(Continued)

(58) Field of Classification Search
CPC ............. C08L 61/06–14; C08L 97/005; C08L 1/00–32; C08L 75/04; C09J 161/06–14;
(Continued)

(56) References Cited

U.S. PATENT DOCUMENTS 1,783,163 A   11/1930   Griswold
1,938,802 A   12/1933   Braun
(Continued)

FOREIGN PATENT DOCUMENTS

AU   2002234469 B2   7/2007
AU   2012250575 B2   3/2015
(Continued)

OTHER PUBLICATIONS

Ruel et al., "Crystalline and amorphous cellulose in the secondary walls of *Arabidopsis*," Plant Sci., vols. 193-194, 48-61 (2012).*
(Continued)

*Primary Examiner* — Kregg T Brooks
(74) *Attorney, Agent, or Firm* — Ballard Spahr LLP

(57) ABSTRACT

Admixtures comprising an adhesive resin and cellulose are disclosed, in which at least a portion of the cellulose is type-II cellulose. Also disclosed are compositions comprising adhesive resins, in which the adhesive resins comprise a condensation product of formaldehyde and at least one phenolic compound, and the condensation product is formed in the presence of cellulose, wherein at least a portion of the cellulose is type-II cellulose. Articles of manufacture containing the admixtures and compositions, such as plywood and oriented strand board, are also disclosed. In addition, methods of preparing the compositions and articles of manufacture are disclosed.

16 Claims, 7 Drawing Sheets

(51) Int. Cl.
| | |
|---|---|
| *C08H 7/00* | (2011.01) |
| *C08L 97/00* | (2006.01) |
| *C08L 1/02* | (2006.01) |
| *C08B 15/00* | (2006.01) |
| *C09J 101/02* | (2006.01) |
| *C09J 161/06* | (2006.01) |
| *C09J 175/04* | (2006.01) |
| *C08B 15/02* | (2006.01) |
| *C07G 1/00* | (2011.01) |
| *C08B 11/18* | (2006.01) |
| *C08B 15/06* | (2006.01) |
| *C08L 97/02* | (2006.01) |
| *C09J 11/06* | (2006.01) |
| *C09J 201/00* | (2006.01) |
| *G01N 23/20* | (2018.01) |

(52) U.S. Cl.
CPC .............. *C08B 15/02* (2013.01); *C08B 15/06* (2013.01); *C08B 37/0057* (2013.01); *C08H 6/00* (2013.01); *C08L 1/02* (2013.01); *C08L 97/005* (2013.01); *C08L 97/02* (2013.01); *C09J 101/02* (2013.01); *C09J 161/06* (2013.01); *C09J 175/04* (2013.01); *C09J 11/06* (2013.01); *C09J 201/00* (2013.01); *G01N 23/20* (2013.01)

(58) Field of Classification Search
CPC ............ C09J 197/005; C09J 101/00–32; C09J 175/04
See application file for complete search history.

(56) References Cited

U.S. PATENT DOCUMENTS

| | | | |
|---|---|---|---|
| 1,959,433 A | 5/1934 | Leetscher | |
| 2,156,159 A | 4/1939 | Olson | |
| 2,198,785 A | 4/1940 | Mohr | |
| 2,356,500 A | 8/1944 | Boinot | |
| 2,398,001 A | 4/1946 | Haney et al. | |
| 2,516,833 A | 8/1950 | Ant-Wuorinen | |
| 2,727,869 A | 6/1953 | Lambuth | |
| 2,669,522 A | 2/1954 | Othmer et al. | |
| 2,681,871 A | 6/1954 | Wallace | |
| 2,759,856 A | 8/1956 | Saums | |
| 2,781,328 A * | 2/1957 | Ayers | C09J 161/06 523/129 |
| 2,801,939 A | 8/1957 | Hignett | |
| 2,810,394 A | 10/1957 | Ferguson | |
| 2,822,784 A | 2/1958 | Heller | |
| 2,851,382 A | 9/1958 | Schmidt | |
| 2,881,783 A | 4/1959 | Andrews | |
| 2,994,633 A | 8/1961 | Clark | |
| 2,997,466 A | 8/1961 | Ball | |
| 3,017,303 A | 1/1962 | Ayers | |
| 3,093,605 A | 6/1963 | Ayers | |
| 3,099,633 A | 7/1963 | Black | |
| 3,212,932 A | 10/1965 | Hess | |
| 3,282,869 A | 11/1966 | Bryner | |
| 3,293,200 A | 12/1966 | Macgregor | |
| 3,314,797 A | 4/1967 | Hess | |
| 3,792,719 A | 2/1974 | Dickinson | |
| 3,990,904 A | 11/1976 | Friese et al. | |
| 4,100,016 A | 7/1978 | Diebold et al. | |
| 4,105,467 A | 8/1978 | Buckl et al. | |
| 4,165,240 A | 8/1979 | Enokizono et al. | |
| 4,201,596 A | 5/1980 | Church et al. | |
| 4,210,562 A | 7/1980 | McCombs | |
| 4,268,649 A | 5/1981 | Jellinek et al. | |
| 4,303,562 A | 12/1981 | Hollis, Jr. et al. | |
| 4,308,200 A | 12/1981 | Fremont | |
| 4,316,747 A | 2/1982 | Rugg et al. | |
| 4,316,748 A | 2/1982 | Rugg et al. | |
| 4,318,748 A | 3/1982 | Church | |
| 4,338,199 A | 7/1982 | Modell | |
| 4,357,194 A | 11/1982 | Stofko | |
| 4,363,671 A | 12/1982 | Rugg et al. | |
| 4,366,322 A | 12/1982 | Raymond | |
| 4,368,079 A | 1/1983 | Rugg et al. | |
| 4,405,377 A | 9/1983 | Neuzil | |
| 4,409,032 A | 10/1983 | Paszner et al. | |
| 4,427,453 A | 1/1984 | Reitter | |
| 4,433,126 A | 2/1984 | Hsu et al. | |
| 4,468,256 A | 8/1984 | Hinger | |
| 4,470,851 A | 9/1984 | Paszner et al. | |
| 4,493,797 A | 1/1985 | Avedesian | |
| 4,514,532 A | 4/1985 | Hsu et al. | |
| 4,520,105 A | 5/1985 | Sinner et al. | |
| 4,535,593 A | 8/1985 | Sakka | |
| 4,543,190 A | 9/1985 | Modell | |
| 4,556,430 A | 12/1985 | Converse et al. | |
| 4,587,285 A | 5/1986 | Ayla et al. | |
| 4,607,819 A | 8/1986 | Spils | |
| 4,612,286 A | 9/1986 | Sherman et al. | |
| 4,637,835 A | 1/1987 | Nagle | |
| 4,644,060 A | 2/1987 | Chou | |
| 4,645,541 A | 2/1987 | DeLong | |
| 4,654,259 A | 3/1987 | Stofko | |
| 4,674,285 A | 6/1987 | Durrant et al. | |
| 4,675,198 A | 6/1987 | Sevenants | |
| 4,699,124 A | 10/1987 | Nagle | |
| 4,742,814 A | 5/1988 | Sinner et al. | |
| 4,764,596 A | 8/1988 | Lora et al. | |
| 4,788,236 A * | 11/1988 | Kopf | C08G 8/04 524/55 |
| 4,857,638 A | 8/1989 | Yalpani et al. | |
| 4,946,946 A | 8/1990 | Fields et al. | |
| 4,964,995 A | 10/1990 | Chum et al. | |
| 5,009,746 A | 4/1991 | Hossain et al. | |
| 5,010,156 A | 4/1991 | Cook et al. | |
| 5,017,319 A | 5/1991 | Shen | |
| 5,041,192 A | 8/1991 | Sunol et al. | |
| 5,125,977 A | 6/1992 | Grohmann et al. | |
| 5,169,687 A | 12/1992 | Sunol | |
| 5,176,028 A | 1/1993 | Humphrey | |
| 5,196,460 A | 3/1993 | Lora et al. | |
| 5,213,660 A | 5/1993 | Hossain et al. | |
| 5,328,934 A | 7/1994 | Schiraldi | |
| 5,338,366 A | 8/1994 | Grace et al. | |
| 5,411,594 A | 5/1995 | Brelsford | |
| 5,424,417 A | 6/1995 | Torget et al. | |
| 5,503,996 A | 4/1996 | Torget et al. | |
| 5,512,231 A | 4/1996 | Thies et al. | |
| 5,516,952 A | 5/1996 | Lee et al. | |
| 5,536,325 A | 7/1996 | Brink | |
| 5,558,783 A | 9/1996 | McGuinness | |
| 5,615,708 A | 4/1997 | Barron | |
| 5,628,830 A | 5/1997 | Brink | |
| 5,705,369 A | 1/1998 | Torget et al. | |
| 5,788,812 A | 8/1998 | Agar et al. | |
| 5,811,527 A | 9/1998 | Ishitoku et al. | |
| 5,824,187 A | 10/1998 | Richter et al. | |
| 5,830,763 A | 11/1998 | Junk et al. | |
| 5,980,640 A | 11/1999 | Nurmi et al. | |
| 6,022,419 A | 2/2000 | Torget et al. | |
| 6,025,452 A | 2/2000 | Kurple | |
| 6,083,623 A | 7/2000 | Stofko | |
| 6,090,291 A | 7/2000 | Akai et al. | |
| 6,180,845 B1 | 1/2001 | Catallo et al. | |
| 6,211,422 B1 | 4/2001 | DeSimone et al. | |
| 6,228,177 B1 | 5/2001 | Torget | |
| 6,419,788 B1 | 7/2002 | Wingerson | |
| 6,555,350 B2 | 4/2003 | Ahring et al. | |
| 6,569,640 B1 | 5/2003 | Castor et al. | |
| 6,589,460 B1 | 7/2003 | Shen | |
| 6,642,396 B1 | 11/2003 | Zeitsch et al. | |
| 6,743,928 B1 | 6/2004 | Zeitsch | |
| 6,872,316 B2 | 3/2005 | Heikkila et al. | |
| 6,878,212 B1 | 4/2005 | Pinatti et al. | |
| 6,921,820 B2 | 7/2005 | Arai et al. | |
| 6,929,752 B2 | 8/2005 | Cansell | |
| 7,183,339 B2 | 2/2007 | Shen et al. | |

(56) References Cited

U.S. PATENT DOCUMENTS

| | | |
|---|---|---|
| 7,189,306 B2 | 3/2007 | Gervais |
| 7,238,242 B2 | 7/2007 | Pinatti et al. |
| 7,259,231 B2 | 8/2007 | Cornish et al. |
| 7,262,331 B2 | 8/2007 | van de Beld et al. |
| 7,465,791 B1 | 12/2008 | Hallberg et al. |
| 7,476,296 B2 | 1/2009 | Appel et al. |
| 7,547,539 B2 | 6/2009 | Ikegami et al. |
| 7,566,383 B2 | 7/2009 | Everett et al. |
| 7,585,652 B2 | 9/2009 | Foody et al. |
| 7,649,086 B2 | 1/2010 | Belanger et al. |
| 7,666,637 B2 | 2/2010 | Nguyen |
| 7,670,813 B2 | 3/2010 | Foody et al. |
| 7,754,457 B2 | 7/2010 | Foody et al. |
| 7,771,699 B2 | 8/2010 | Adams et al. |
| 7,955,508 B2 | 6/2011 | Allan et al. |
| 7,960,325 B2 | 6/2011 | Kluko |
| 8,030,039 B1 | 10/2011 | Retsina et al. |
| 8,057,639 B2 | 11/2011 | Pschorn et al. |
| 8,119,823 B2 | 2/2012 | Kilambi |
| 8,268,121 B2 | 9/2012 | Blount |
| 8,282,738 B2 | 10/2012 | Kilambi et al. |
| 8,288,460 B2 | 10/2012 | Balakshin et al. |
| 8,317,928 B1 | 11/2012 | Iyer et al. |
| 8,378,020 B1 | 2/2013 | Balakshin et al. |
| 8,404,051 B2 | 3/2013 | Iyer et al. |
| 8,546,560 B2 | 10/2013 | Kilambi |
| 8,663,800 B2 | 3/2014 | Kadam et al. |
| 8,728,272 B2 | 5/2014 | Yano et al. |
| 8,759,498 B2 | 6/2014 | Kilambi et al. |
| 8,840,995 B2 | 9/2014 | Kadam et al. |
| 8,968,479 B2 | 3/2015 | Kilambi et al. |
| 9,255,188 B2 | 2/2016 | Kilambi et al. |
| 2001/0050096 A1 | 12/2001 | Costantini et al. |
| 2002/0061583 A1 | 5/2002 | Kawamura et al. |
| 2002/0069987 A1 | 6/2002 | Pye |
| 2003/0018187 A1 | 1/2003 | Arai et al. |
| 2003/0156970 A1 | 8/2003 | Oberkofler et al. |
| 2003/0221361 A1 | 12/2003 | Russell et al. |
| 2004/0020854 A1 | 2/2004 | Ali et al. |
| 2004/0074615 A1 | 4/2004 | Nguyen |
| 2004/0231661 A1 | 11/2004 | Griffin et al. |
| 2005/0065336 A1 | 3/2005 | Karstens |
| 2006/0281913 A1 | 12/2006 | Ferreira et al. |
| 2007/0108036 A1 | 5/2007 | Siskin et al. |
| 2007/0148751 A1 | 6/2007 | Griffin et al. |
| 2007/0161095 A1 | 7/2007 | Gurin |
| 2007/0190017 A1* | 8/2007 | Yamasaki ............... C08J 3/12 424/76.1 |
| 2007/0217980 A1 | 9/2007 | Garcia-Ortiz et al. |
| 2007/0254348 A1 | 11/2007 | Retsina et al. |
| 2007/0259412 A1 | 11/2007 | Belanger et al. |
| 2007/0267008 A1 | 11/2007 | Funazukuri et al. |
| 2008/0015336 A1 | 1/2008 | Cornish et al. |
| 2008/0029233 A1 | 2/2008 | Wingerson et al. |
| 2008/0032344 A1 | 2/2008 | Fallavollita |
| 2008/0051566 A1 | 2/2008 | Ohman et al. |
| 2008/0103344 A1* | 5/2008 | Jones .................. C01B 3/22 585/242 |
| 2008/0292766 A1 | 11/2008 | Hoffman et al. |
| 2008/0295981 A1 | 12/2008 | Shin et al. |
| 2008/0302492 A1 | 12/2008 | Shin et al. |
| 2009/0023187 A1 | 1/2009 | Foody et al. |
| 2009/0038212 A1 | 2/2009 | Cooper |
| 2009/0056201 A1 | 3/2009 | Morgan |
| 2009/0069550 A1 | 3/2009 | Belanger et al. |
| 2009/0118477 A1 | 5/2009 | Hallberg et al. |
| 2009/0176286 A1 | 7/2009 | O'Connor et al. |
| 2009/0176979 A1 | 7/2009 | Hara et al. |
| 2009/0205546 A1 | 8/2009 | Kluko |
| 2009/0221814 A1 | 9/2009 | Pschorn et al. |
| 2009/0223612 A1 | 9/2009 | McKnight et al. |
| 2009/0229599 A1 | 9/2009 | Zhang |
| 2009/0232892 A1 | 9/2009 | Yamasaki et al. |
| 2009/0288788 A1 | 11/2009 | Castor |
| 2009/0308552 A1* | 12/2009 | Yano ................. C08B 1/003 162/164.3 |
| 2010/0004119 A1 | 1/2010 | Gadkaree et al. |
| 2010/0012583 A1 | 1/2010 | Stuart |
| 2010/0043782 A1 | 2/2010 | Kilambi et al. |
| 2010/0048884 A1 | 2/2010 | Kilambi |
| 2010/0048924 A1 | 2/2010 | Kilambi |
| 2010/0055629 A1 | 3/2010 | McKnight et al. |
| 2010/0063271 A1 | 3/2010 | Allan et al. |
| 2010/0069626 A1 | 3/2010 | Kilambi |
| 2010/0077752 A1 | 4/2010 | Papile |
| 2010/0081798 A1 | 4/2010 | Balensiefer et al. |
| 2010/0136634 A1 | 6/2010 | Kratochvil et al. |
| 2010/0136642 A1 | 6/2010 | Belanger et al. |
| 2010/0146842 A1 | 6/2010 | Dumenil |
| 2010/0146843 A1 | 6/2010 | Dumenil |
| 2010/0152509 A1 | 6/2010 | Ekman |
| 2010/0159569 A1 | 6/2010 | Medoff et al. |
| 2010/0170504 A1 | 7/2010 | Zhang |
| 2010/0175690 A1 | 7/2010 | Nagahama et al. |
| 2010/0184151 A1 | 7/2010 | Tolan et al. |
| 2010/0203605 A1 | 8/2010 | Kim et al. |
| 2010/0233771 A1 | 9/2010 | McDonald et al. |
| 2010/0269990 A1 | 10/2010 | Dottori et al. |
| 2010/0279361 A1 | 11/2010 | South et al. |
| 2010/0305242 A1 | 12/2010 | Balakshin et al. |
| 2010/0305243 A1 | 12/2010 | Balakshin et al. |
| 2010/0305244 A1 | 12/2010 | Balakshin et al. |
| 2010/0326610 A1 | 12/2010 | Harvey et al. |
| 2010/0329938 A1 | 12/2010 | Allan et al. |
| 2010/0330638 A1 | 12/2010 | Aita et al. |
| 2011/0021743 A1 | 1/2011 | Cornish et al. |
| 2011/0076724 A1 | 3/2011 | Dumenil |
| 2011/0079219 A1 | 4/2011 | McDonald et al. |
| 2011/0100359 A1 | 5/2011 | North |
| 2011/0126448 A1 | 6/2011 | Dumenil |
| 2011/0137085 A1 | 6/2011 | Trahanovsky et al. |
| 2011/0151516 A1 | 6/2011 | Van Der Heide et al. |
| 2011/0165643 A1 | 7/2011 | Retsina et al. |
| 2011/0171709 A1 | 7/2011 | Bardsley |
| 2011/0183394 A1 | 7/2011 | Bell et al. |
| 2011/0192560 A1 | 8/2011 | Heikkila et al. |
| 2011/0232160 A1 | 9/2011 | Siskin et al. |
| 2011/0237838 A1 | 9/2011 | Zmierczak et al. |
| 2011/0239973 A1 | 10/2011 | Qin |
| 2011/0253326 A1 | 10/2011 | Sherman et al. |
| 2011/0287502 A1 | 11/2011 | Castor |
| 2011/0294991 A1 | 12/2011 | Lake et al. |
| 2012/0103325 A1 | 5/2012 | Koenig et al. |
| 2012/0108798 A1 | 5/2012 | Wenger et al. |
| 2012/0116063 A1 | 5/2012 | Jansen et al. |
| 2012/0136097 A1 | 5/2012 | Berlin |
| 2012/0145094 A1 | 6/2012 | Simard |
| 2012/0146784 A1 | 6/2012 | Hines et al. |
| 2012/0184788 A1 | 7/2012 | Loop et al. |
| 2012/0247617 A1 | 10/2012 | Berlin et al. |
| 2012/0279496 A1 | 11/2012 | Tao |
| 2012/0279573 A1 | 11/2012 | Simard et al. |
| 2012/0279579 A1 | 11/2012 | Simard et al. |
| 2012/0282465 A1 | 11/2012 | Kadam et al. |
| 2012/0282466 A1 | 11/2012 | Iyer et al. |
| 2012/0282467 A1 | 11/2012 | Iyer et al. |
| 2012/0282655 A1 | 11/2012 | Gibbs |
| 2012/0282656 A1 | 11/2012 | Gibbs |
| 2012/0285445 A1 | 11/2012 | Kilambi et al. |
| 2012/0291774 A1 | 11/2012 | Kilambi et al. |
| 2012/0302699 A1 | 11/2012 | Kobune et al. |
| 2013/0172540 A1 | 7/2013 | Simard et al. |
| 2013/0178563 A1 | 7/2013 | Balakshin et al. |
| 2013/0211056 A1 | 8/2013 | Berlin et al. |
| 2013/0239954 A1 | 9/2013 | Kilambi et al. |
| 2013/0252292 A1 | 9/2013 | Berlin et al. |
| 2014/0030524 A1 | 1/2014 | Kadam et al. |
| 2014/0039144 A1 | 2/2014 | Simard et al. |
| 2014/0046041 A1 | 2/2014 | South et al. |
| 2014/0243511 A1 | 8/2014 | Tamminen et al. |

(56) References Cited

U.S. PATENT DOCUMENTS

| | | | |
|---|---|---|---|
| 2014/0275501 A1 | 9/2014 | Capanema et al. | |
| 2016/0108182 A1 | 4/2016 | Kilambi et al. | |

FOREIGN PATENT DOCUMENTS

| | | | |
|---|---|---|---|
| CA | 1010859 A1 | 5/1977 | |
| CA | 1284637 C | 6/1991 | |
| CA | 2701194 A1 | 10/2010 | |
| CN | 1018121 B | 9/1992 | |
| CN | 1680415 A | 10/2005 | |
| CN | 1931866 A | 3/2007 | |
| CN | 101200479 A | 6/2008 | |
| CN | 101586136 A | 11/2009 | |
| CN | 101613377 A | 12/2009 | |
| CN | 101613970 A | 12/2009 | |
| CN | 101736631 A | 6/2010 | |
| CN | 101787398 A | 7/2010 | |
| CN | 101886143 A | 11/2010 | |
| CN | 102239184 A | 11/2011 | |
| CZ | 225851 | 3/1984 | |
| CZ | 248106 | 1/1987 | |
| DE | 3225074 A1 | 1/1984 | |
| DE | 10259928 A1 | 7/2004 | |
| EA | 200700715 A1 | 10/2007 | |
| EP | 0037912 A2 | 10/1981 | |
| EP | 0098490 A2 | 1/1984 | |
| EP | 0492016 A1 | 7/1992 | |
| EP | 0882756 A2 | 12/1998 | |
| EP | 1194226 A2 | 4/2002 | |
| EP | 1304412 A2 | 4/2003 | |
| EP | 1364072 A2 | 11/2003 | |
| EP | 1527204 A1 | 5/2005 | |
| EP | 1686192 A1 | 8/2006 | |
| EP | 1836181 A1 | 9/2007 | |
| EP | 2042519 A1 | 4/2009 | |
| FR | 2580669 A1 | 10/1986 | |
| GB | 291991 A | 6/1928 | |
| GB | 692284 A | 6/1953 | |
| GB | 841749 A | 7/1960 | |
| GB | 1245486 A | 9/1971 | |
| GB | 1569138 A | 6/1980 | |
| GB | 2145090 A | 3/1985 | |
| JP | 50-145537 | 11/1975 | |
| JP | 56-045754 | 4/1981 | |
| JP | 57-061083 | 4/1982 | |
| JP | 62-283988 | 12/1987 | |
| JP | H01-158022 A | 6/1989 | |
| JP | H11-226385 A | 8/1999 | |
| JP | 2001-095594 A | 4/2001 | |
| JP | 2001-262162 A | 9/2001 | |
| JP | 2003-212888 A | 7/2003 | |
| JP | 2003213037 A | 7/2003 | |
| JP | 2005-040025 A | 2/2005 | |
| JP | 2005-296906 A | 10/2005 | |
| JP | 2006-223152 A | 8/2006 | |
| JP | 2006-255676 A | 9/2006 | |
| JP | 2006-263527 A | 10/2006 | |
| JP | 2007-313476 A | 12/2007 | |
| JP | 2008-011753 A | 1/2008 | |
| JP | 2008-035853 A | 2/2008 | |
| JP | 2008-248202 A | 10/2008 | |
| JP | 2008-292018 A | 12/2008 | |
| JP | 04197192 B2 | 12/2008 | |
| JP | 2009-189291 A | 8/2009 | |
| JP | 2010-042604 A | 2/2010 | |
| JP | 2011-32388 | 2/2011 | |
| KR | 2009030967 | 3/2009 | |
| KR | 20090039470 A | 4/2009 | |
| KR | 20100032242 A | 3/2010 | |
| RU | 2220245 C2 | 12/2003 | |
| RU | 2338769 C1 | 11/2008 | |
| RU | 2371002 C1 | 10/2009 | |
| SU | 1086046 A1 | 4/1984 | |
| WO | WO-83/00370 A1 | 2/1983 | |
| WO | WO-83/01958 A1 | 6/1983 | |
| WO | WO-89/04068 A1 | 5/1989 | |
| WO | WO-97/14747 A1 | 4/1997 | |
| WO | WO-98/17727 A1 | 4/1998 | |
| WO | WO-98/31764 A1 | 7/1998 | |
| WO | WO-99/23260 A1 | 5/1999 | |
| WO | WO-99/67409 A1 | 12/1999 | |
| WO | WO-00/61276 A1 | 10/2000 | |
| WO | WO-01/32715 A1 | 5/2001 | |
| WO | WO-01/60752 A1 | 8/2001 | |
| WO | WO-02/04524 | 1/2002 | |
| WO | WO-02/070753 A2 | 9/2002 | |
| WO | WO-03/092972 A1 | 11/2003 | |
| WO | WO-2004/013409 A1 | 2/2004 | |
| WO | WO-2007/009463 A2 | 1/2007 | |
| WO | WO-2007/056701 A2 | 5/2007 | |
| WO | WO-2007/120210 A2 | 10/2007 | |
| WO | WO-2008/010464 A1 | 1/2008 | |
| WO | WO-2008/026932 A1 | 3/2008 | |
| WO | WO-2008/036500 A2 | 3/2008 | |
| WO | WO-2008/050740 A1 | 5/2008 | |
| WO | WO-2008/121043 A1 | 10/2008 | |
| WO | WO-2008/143078 A1 | 11/2008 | |
| WO | WO-2009/015409 A1 | 2/2009 | |
| WO | WO-2009/060126 A1 | 5/2009 | |
| WO | WO-2009/086141 A2 | 7/2009 | |
| WO | WO-2009/108773 A2 | 9/2009 | |
| WO | WO-2010/009343 A2 | 1/2010 | |
| WO | WO-2010/034055 A1 | 4/2010 | |
| WO | WO-2010/045576 A2 | 4/2010 | |
| WO | WO-2010/046532 A1 | 4/2010 | |
| WO | WO-2010/069516 A2 | 6/2010 | |
| WO | WO-2010/113129 A2 | 10/2010 | |
| WO | WO-2010/121367 A1 | 10/2010 | |
| WO | WO-2011/002822 A1 | 1/2011 | |
| WO | WO-2011/007369 A1 | 1/2011 | |
| WO | WO-2011/091044 A1 | 7/2011 | |
| WO | WO-2011/094859 A1 | 8/2011 | |
| WO | WO-2011/099544 A1 | 8/2011 | |
| WO | WO-2012/106808 A1 | 8/2012 | |
| WO | WO-2012/151509 A2 | 11/2012 | |
| WO | WO-2012/151521 A2 | 11/2012 | |
| WO | WO-2012/151524 A2 | 11/2012 | |
| WO | WO-2012/151526 A2 | 11/2012 | |
| WO | WO-2012/151529 A2 | 11/2012 | |
| WO | WO-2012/151531 A2 | 11/2012 | |
| WO | WO-2012/151536 A2 | 11/2012 | |
| WO | WO-2013/101397 A1 | 7/2013 | |
| WO | WO-2013/144445 A1 | 10/2013 | |
| WO | WO-2013/144453 A1 | 10/2013 | |
| WO | WO-2013/144454 A1 | 10/2013 | |
| WO | WO-2014/124541 A1 | 8/2014 | |
| WO | WO-2016/049564 A1 | 3/2016 | |
| WO | WO-2016/049567 A1 | 3/2016 | |
| WO | WO-2016/049569 A1 | 3/2016 | |

OTHER PUBLICATIONS

"Evaluation of materials for use in letdown valves and coal feed pumps for coal liquefaction service", Electr Power Res Inst Rep EPRIAF, No. 579, 1978, 94 (Abstract).
"Evaluation of materials for use in letdown valves for coal liquefaction service", Annual Conference on Materials for Coal Conversion and Utilization (CONF-791014), Oct. 9-11, 1979 (Abstract).
"Lignin and its properties", Dialogue/Newsletters, vol. 9, No. 1, Lignin Institute, Jul. 2001 (5 pages).
"Merriam-Webster Dictionary, "Quench-Definition"", document available at: <http://www.merriam-webster.com/dictionary/quench>, Retrieved on Feb. 9, 2012, Feb. 2, 2012, 1 (3 pages).
"The Alternative Energy Magazine", http://www.altenergymag.com/emagazine/2009/06/lignin-as-alternativerenewable-fuel/1384), retrieved from the internet at least as early as May 16, 2012 (2 pages).
Adler, E. 1977. "Lignin chemistry—Past, present and future," Wood Sci. Technol. 11, 169-218.
Adler, E., et al. 1987. "Investigation of the acid-catalyzed alkylation of lignins by means of NMR spectroscopic methods," Holzforschung, 41, 199-207.

(56) References Cited

OTHER PUBLICATIONS

Adschiri et al., "Cellulose hydrolysis in supercritical water to recover chemicals", Reaction Engineering for Pollution Prevention, 2000, 205-220.
Adschiri et al., "Noncatalytic Conversion of Cellulose in Supercritical and Sub-Critical Water", Journal of Chemical Engineering of Japan, 1993, 26(6): 676-680.
Akiyama, T., et al. 2005. "Erythro/threo ratio of β-O-4 structures as an important structural characteristic of lignin. Part IV. Variatioin in erythro/threo ratio in softwood and hardwood lignins and its relation to syringyl/guaiacyl ratio," Holzforschung, 59, 276-281.
Arai et al., "Biomass conversion in supercritical water for chemical recycle", Enerugi, Shigen, 16(2), 1995, 175-180 (Abstract).
Argyropoulos, D. 2010. "Heteronuclear NMR spectroscopy of lignins." In: Lignin and Lignans: Advances in Chemistry. Heitner, C., Dimmel, D. & Schmidt, J. Eds., CRC Press, Boca Raton, London, New York, 245-265.
Automated Bonding Evaluation System (ABES). Adhesive Evaluation Systems, Inc. 2005 (4 pages).
Baek et al., "Optimization of the pretreatment of rice straw hemicellulosic hydrolyzates for microbial production of xylitol", Biotechnology and Bioprocess Engineering, 12(4), 2007, 404-409(Abstract).
Balakshin et al., Characterization of Lignocellulosic Mateirals, Chapter 9, Blackwell Publishing, 2008, pp. 148-170.
Balakshin, M., et al. 2003. "Elucidation of the structures of residual and dissolved pine kraft lignins using an HMQC technique," J. Agric. Food Chem., 51, 6116-6127.
Balakshin, M., et al. 2007. "MWL fraction with a high concentration of lignin-carbohydrate linkages: Isolation and 2D NMR spectroscopic analysis," Holzforschung, 61, 1-7.
Balakshin, M., et al. 2008. "Recent advances in isolation and analysis of lignins and lignin-carbohydrate complexes." In: Characterization of Lignocellulosic Materials, Hu, T. Q., Ed., Blackwell, Oxford, UK, 148-170.
Balakshin, M., et al. 2011. "Quantification of lignin-carbohydrate linkages with high-resolution NMR spectroscopy," Planta, 233, 1097-1110.
Balhouse , "Design, fabrication, and evaluation of a spiral-flow letdown valve", Electric Power Research Institute, Advanced Power Systems Division, EPRI AP, 1981(Abstract).
Ballesteros et al., "Fractionation of Cynara cardunculus (cardoon) biomass by dilute-acid pretreatment", Applied Biochemistry and Biotechnology, 137-140, 2007, 239-252 (Abstract).
Baumberger, S., et al. 2007. "Molar mass determination of lignins by size-exclusion chromatography: towards standardisation of the method," Holzforschung, 61:459-68.
Beauchet, R., et al. 2012. "Conversion of lignin to aromatic-based chemical (L-chems) and biofuels (L-fuels)," Bioresource Technology, 121; 328-34.
Bennett et al., "Chemicals from Forest Products by Supercritical Fluid Extraction", Fluid Phase Equil. 1983; 10:337.
Berlin, A., et al. 2006. "Inhibition of cellulase, xylanase and β-glucosidase activities by softwood lignin preparations," Journal of Biotechnology, 125,198-209.
Berlin, A., et al. 2014. "Industrial lignins: Analysis, properties and applications." In: Bioenergy Research: Advances and Applications. Gupta V. K., Kubicek, C. P., Saddler, J., Xu, F. & Tuohy, M., Eds., Elsevier, 315-336.
Bicker et al., "Catalytic conversion of carbohydrates in subcritical water: A new chemical process for lactic acid production", Journal of Molecular Catalysis A: Chemical, 2005, 239:151-157.
Bobleter, "Hydrothermal Degradation and Fractionation of Saccharides and Polysaccharides", 1998.
Boerjan, et al., "Lignin biosynthesis", Ann. Rev. Plant Bio., 54(1), Jun. 2003, 519-549 (Abstract).
Boocock et al., "Liquefaction of Biomass by Rapid Hydrolysis", Can. J. Chem. Eng., 1983, 61:80-6.
Bustos et al., "Modeling of the hydrolysis of sugar cane bagasse with hydrochloric acid", Applied Biochemistry and Biotechnology, 104(1), 2003, 51-68 (Abstract).
Capanema, E., et al. 2001. "Structural analysis of residual and technical lignins by 1H-13C correlation 2D NMR-spectroscopy," Holzforschung, 55(3), 302-308.
Capanema, E., et al. 2004. "A comprehensive approach for quantitative lignin characterization by NMR spectroscopy," J. Agric. Food Chem., 52, 1850-1860.
Capanema, E., et al. 2004. "An improved procedure for isolation of residual lignins from hardwood kraft pulps," Holzforschung, 58, 464-472.
Capanema, E., et al. 2005. "Isolation and characterization of residual lignins from hardwood pulps: Method improvements," Proc. 13th ISWFPC, Auckland, New Zealand, v.III, 57-64.
Capanema, E., et al. 2005. "Quantitative characterization of a hardwood milled wood lignin by NMR spectroscopy," J. Agric. Food Chem., 53, 9639-9649.
Capanema, E., et al. 2008. "Quantitative analysis of technical lignins by a combination of 1H-13C HMQC and 13C NMR methods," Proceedings of International Conference on Pulping, Papermaking and Biotechnology, 647-651.
Capanema, E., et al. 2015. "How well do MWL and CEL preparations represent the whole hardwood lignin?" Journal of Wood Chemistry & Technology, 35, 17-26.
Carrasco et al., "Effects of dilute acid and steam explosion pretreatments on the cellulose structure and kinetics of cellulosic fraction hydrolysis by dilute acids in lignocellulosic materials", Applied Biochemistry and Biotechnology, 45-46, 1994, 23-34 (Abstract).
Carrasco et al., "SO2-catalyzed steam pretreatment and fermentation of enzymatically hydrolyzed sugarcane bagasse", Enzyme and Microbial Technology, 46(2), 2010, 64-73 (Abstract).
Carvalho et al., "Sugarcane bagasse hydrolysis with phosphoric and sulfuric acids and hydrolysate detoxification for xylitol production", Journal of Chemical Technology and Biotechnology, 79(11), 2004, 1308-1312 (Abstract).
Cateto, C., et al. 2008. "Lignins as macromonomers for polyurethane synthesis: A comparative study on hydroxyl group determination," Journal of Applied Polymer Science, 109(5), 3008-3017.
Cavdar, A.D. et al., Some of the Properties of Oriented Strandboard Manufactured Using Kraft Lignin Phenolic Resin. J Mat Proc Technol. 2008; 202:559-63.
Çetin, N.S. and N. Özmen, Use of Organosolv Lignin in Phenol-Formaldehyde Resins fo Particleboard Production. I. Organosolv Lignin Modified Resins. Int J Adhes Adhes. 2002; 22:588-80.
Chamblee et al., "Reversible in situ acid formation for .beta.—pinene hydrolysis using CO2 expanded liquid and hot water", Green Chemistry, 2004, vol. 6, 382-386.
Chen et al., "Study on dilute-acid pretreatment of corn stalk", Linchan Huaxue Yu Gongye, 29(2), 2009, 27-32 (Abstract).
Conner, et al., "Carbohydrate Modified Phenol-Formaldehyde Resins", vol. 6(4), 1986, 591-613.
Converti et al., "Wood hydrolysis and hydrolyzate detoxification for subsequent xylitol production", Chemical Engineering & Technology, 23(11), 2000, 1013-1020 (Abstract).
Dias et al., "Dehydration of xylose into furfural over micro-mesoporous sulfonic acid catalysts", Journal of Catalysis, 2005, vol. 229, 414-423.
Do Egito De Paiva et al., "Optimization of D-xylose, L-arabinose and D-glucose production obtained from sugar cane bagasse hydrolysis process", Brazilian Symposium on the Chemistry of Lignins and Other Wood Components, 6th, 2001, 333-337 (Abstract).
Dogaris et al., "Hydrothermal processing and enzymatic hydrolysis of sorghum bagasse for fermentable carbohydrates production", Bioresource Technology, 100(24), 2009, 6543-6549 (Abstract).
Eckert et al., "Supercritical fluid processing", Environmental Science and Technology, 1986, 20: 319-325.
Ehara , "Chemical conversion of woody biomass by supercritical water", Graduate School of Energy Science, Kyoto University, Kyoto Japan (2 pages).
Ehara et al., "A comparative study on chemical conversion of cellulose between the batch-type and flow-type in supercritical water", Cellulose, 2002, vol. 9, 301-311.

(56) References Cited

OTHER PUBLICATIONS

Ehara et al., "Decomposition behavior of cellulose in supercritical water, subcritical water, and their combined treatments", J. Wood Sci., vol. 51, 2005, 148-153.

Ehara, et al., "Characterization of the lignin-derived products from wood as treated in supercritical water", Journal of Wood Science, vol. 48, No. 4, Aug. 2002, pp. 320-325.

Ehrman , "Methods for the chemical analysis of biomass process streams", Handbook on Bioethanol, 1996, 395-415.

Erzengin et al., "Liquefaction of Sunflower Stalk by Using Supercritical Extraction", Energy Conversion and Management, Elsevier Science Publishers, Oxford, GB, Aug. 1998, 39:11, 1203-1206.

Evtuguin, D. V., et al. 2001. "Comprehensive study on the chemical structure of dioxane lignin from plantation Eucalyptus globulus wood," J. Agric. Food Chem. 49, 4252-4261.

Faix, O., et al. 1994. "Determination of hydroxyl groups in lignins. Evaluation of 1H-, 13C-, 31 P-NMR, FTIR and wet chemistry methods," Holzforschung 48, 387-394.

Fujimoto, A., et al. 2005. "Quantitative evaluation of milling effects on lignin structure during the isolation process of milled wood lignin," J. Wood Sci., 51, 89-91.

Garrote et al., "Manufacture of xylose-based fermentation media from corncobs by posthydrolysis of autohydrolysis liquors", Applied Biochemistry and Biotechnology, 95(3), 2001, 195-207 (Abstract).

Geddes et al., "Optimizing the saccharification of sugar cane bagasse using dilute phosphoric acid followed by fungal celluloses", Bioresource Technology, 101(6), 2010, 1851-1857 (Abstract).

Gellerstedt, G. & Robert, D. 1987. "Quantitative 13C NMR analysis of kraft lignins," Acta Chemica Scandinavica B41, 541-546.

Gellerstedt, G. 1996. "Chemical structure of pulp components." In: Pulp Bleaching: Principles and Practice, Dence, C. W. & Reeve, D. W. Eds., Tappi, 91-111.

Ghaffar, S.H. and M. Fan, Structural Analysis for Lignin Characteristics in Biomass Straw. Biomass Bioenergy. 2013; XXX:1-16.

Gierer, J. 1980. "Chemical aspects of kraft pulping," Wood Sci. Technol. 14, 241-266.

Glasser, et al. 1983. "The chemistry of several novel bioconversion lignins," J. Agric. Food Chem., 31, 921-930.

Glasser, W. 2000. "Classification of lignin according to chemical and molecular structure." In: Lignin: Historical, Biological, and Materials Perspectives. W. Glasser, R. Northey & T., Eds., Schultz. Washington, DC, 216-238.

Gong et al., "Study on hydrolysis and saccharification of microcrystalline cellulose in supercritical water", Xiandai Huagong, 30(2), 2010, 44-47 (Abstract; 1 page).

Gosselink, R., et al. 2010. "Fractionation, analysis, and PCA modeling of properties of four technical lignins for prediction of their application potential in binders," Holzforschung 64(2), 193-200.

Granata, A. & D. Argyropoulos. 1995. "2-Chloro-4,4,5,5-tetramethyl-1,3,2-dioxaphospholane, a reagent for the accurate determination of the uncondensed and condensed phenolic moieties in lignins," Journal of Agricultural and Food Chemistry 43(6), 1538-1544.

Guerra, A., et al. 2006. "Comparative evaluation of three lignin isolation protocols for various wood species," J. Agric. Food Chem. 54, 9696-9705.

Guirong et al., "Cellulose decomposition behavior in hot-compressed aprotic solvents", Science in China Series B: Chemistry, May 2008, vol. 51, No. 5, 479-486.

Hamelinck et al., "Ethanol from lignocellulosic biomass: techno-economic performance in short-, middle- and long-term", Biomass and Bioenergy, vol. 28, 2005, 384-410.

Harmer et al., "A new route to high yield sugars from biomass: phosphoric-sulfuric acid", Chemical Communications, vol. 43, 2009, 6610-6612 (Abstract).

Helm, R. F. 2000. "Lignin-polysaccharide interactions in woody plants." In: Lignin: Historical, Biological, and Materials Perspectives, Glasser, W., Northey, R., Schultz, T., Eds., ACS Symp. Series 742, Washington, DC, 161-171.

Herrera et al., "Production of Xylose from Sorghum Straw Using Hydrochloric Acid", Journal of Cereal Science, 37(3), 2003, 267-274 (Abstract).

Holgate et al., "Glucose Hydrolysis and Oxidation in Supercritical Water", AIChE Journal, 1995, 41(3), 637-648.

Holtman, et al. 2006. "Quantitative 13C NMR characterization of milled wood lignins isolated by different milling techniques," Journal of Wood Chemistry and Technology, 26(1), 21-34.

Hosaka, "Filtration of lignin in hydrolysis solution", Hiroshima Daigaku Suichikusangakubu Kiyo, 17(1), 1978, 17-25 (Abstract).

Houghton et al., "Reactivity of Some Organic Compounds with Supercritical Water", Fuel, 1986, 61:827-32.

http://www.astm.org/Standards/E1755.htm, retrieved from the internet at least as early as May 16, 2012 (2 pages).

Ioannidou et al., "Direct determination of toxic trace metals in honey and sugars using inductively coupled plasma atomic emission spectrometry", Talanta, 65(1), 2005, 92-97.

Jensen et al., "Effects of dilute acid pretreatment conditions on enzymatic hydrolysis monomer and oligomer sugar yields for aspen, balsam, and switchgrass", Bioresource Technology, 101(7), 2010, 2317-2325 (Abstract; 1 page).

Jeong et al., "Optimizing dilute-acid pretreatment of rapeseed straw for extraction of hemicellulose", Applied Biochemistry and Biotechnology, 161(1-8), 2010, 22-33 (Abstract).

Jiang et al., "A method for quick analysis of biomass chemical composition from element analysis", Huagong Xuebao (Chinese Edition), 61(6), 2010, 1506-1509 (Abstract).

Jin, Y. et al., Preparation and Characterization of Phenol-Formaldehyde Adhsives Modified with Enzymatic Hydrolysis Lignin. Bioresource Technol. 2010; 101:2046-8.

Kamada et al., "Development of letdown valve on pilot plant", Sekitan Kagaku Kaigi Happyo Ronbunshu, 35th, 1998, 459-462 (Abstract; 1 page).

Kamm et al., "Principles of biorefineries", Appl. Microbiol. Biotechnol, vol. 64, 2004, 137-145.

Karimi et al., "Conversion of rice straw to sugars by dilute-acid hydrolysis", Biomass and Bioenergy, 30(3), 2006, 247-253 (Abstract).

Kim et al., "Selective Synthesis of Furfural from Xylose with Supercritical Carbon Dioxide and Solid Acid Catalyst", Journal of Industrial and Engineering Chemistry, The Korean Society of Industrial and Engineering Chemistry, Korea, 2001, 7(6);424-429.

Kirk-Othmer, "Supercritical Fluids", Encyclopedia of Chemical Technology 3rd ed., John Wiley & Sons, New York (29 pages).

Knopf et al., "Reactive Extraction of Lignin from Biomass Using Supercritical Ammonia-Water Mixtures", J. Supercritical Fluids, 1993, 6: 249-254.

Koshijima, T., et al. 2003. Association between lignin and carbohydrates in wood and other plant tissues. Springer-Verlag, Berlin/Heidelberg/New York (8 pages).

Kostukevich, N., et al. 1993. "Determination of the hydroxyl containing functional groups of the oxygen-acetic lignins by 31P NMR spectroscopy," Proceedings of the 7th International Symposium on Wood and Pulping Chemistry, Beijing, China, 503-507.

Kupianen et al., "Comparison of formic and sulfuric acids as a glucose decomposition catalyst", Ind. Eng. Chem. Res., 49(18), 2010, 8444-8449 (Abstract).

Lawoko, M., et al. 2005. "Structural differences between the lignin-carbohydrate complexes in wood and in chemical pulps," Biomacromolecules, 6, 3467-3473.

Lee et al., "Hydrolysis of cellulose under subcritical and supercritical water using continuous flow system", Hwahak Konghak, 39(2), 2001, 257-263 (Abstract; 1 page).

Levai, "Atom spectrometric methods for determination of trace metal impurities in pharmaceutical substances", Acta Pharmaceutica Hungarica, 71(3), 2001, 350-356 (Abstract).

Li, "Analysis of failure cause in CCI pressure reducing valves used in product pipeline", Guandao Jishu Yu Shebei, (5), 2008, 34-36 (Abstract).

Li et al., "Fructose decomposition kinetics in organic acids-enriched high temperature liquid water", Biomass and Bioenergy, vol. 33, Issue 9, Sep. 2009, 1182-1187 (Abstract).

(56) References Cited

OTHER PUBLICATIONS

Li et al., "Improvement on technology of extracting xylose from the corncobs by acid method", Shipin Gongye Keji, 30(6), 2009, 263-264 (Abstract).
Li et al., "Interaction of Supercritical Fluids with Lignocellulosic Materials", Industrial and Engineering Chemistry Research, 1988, 27(7): 1301-6.
Li et al., "Studies of Monosaccharide Production through Lignocellulosic Waste Hydrolysis Using Double Acids", Energy & Fuels, 22(3), 2008, 2015-2021 (Abstract; 1 page).
Li et al., "Study on the recovery of lignin from black liquor by ultrafiltration", Huaxue Gongcheng, 31(1), 2003, 49-52 (Abstract).
Li, J., et al. 2009. "Steam explosion lignins; their extraction, structure and potential as feedstock for biodiesel and chemicals," Bioresource Tech., 100, 2556-2561.
Liitia, T. M., et al. 2003. "Analysis of technical lignins by two- and three-dimensional NMR spectroscopy," J. Agric Food Chem., 51, 2136-2143.
Lin, S. & C. Dence. 1992. Methods of Lignin Chemistry. Springer-Verlag, Heidelberg/Berlin/New York (24 pages).
Lloyd et al., "Combined sugar yields for dilute sulfuric acid pretreatment of corn stover followed by enzymatic hydrolysis of the remaining solids", Bioresource Technology, 96(18), 2005, 1967-1977 (Abstract).
Lopez et al., "Chemical characterization and dilute-acid hydrolysis of rice hulls from an artisan mill", BioResources, 5(4), 2010, 2268-2277 (Abstract).
Lora, J. 2008. "Industrial commercial lignins: Sources, properties and applications." In: Monomers, Polymers and Composites from Renewable Resources, Belgacem, M., and Gandini, A. Eds., Elsevier, Oxford, UK, 225-241.
Lora, J. H. & Glasser, W.G. 2002. "Recent industrial applications of lignin: A sustainable alternative to nonrenewable materials," Journal of Polymers and the Environment, 10, 39-48.
Lu et al, "Two-step hydrolysis of Japanese beech as treated by semi-flow hot-compressed water", 2009, J. Wood Sci., vol. 55, pp. 367-375.
Lu et al., "Decomposition of Cellulose to Produce 5-hydroxymethyl-furaldehyde in Subcritical Water", Abstract of Transactions of Tranjin University, STN Accession No. 2008:1016799, Document No. 151:427986, 2008, 14(3), 198201 (1 page).
Lu et al., "Optimization of H2SO4-catalyzed hydrothermal pretreatment of rapeseed straw for bioconversion to ethanol: focusing on pretreatment at high solids content", Bioresource Technology, 100(12), 2009, 3048-3053 (Abstract).
Luterbacher et al., "High-Solids Biphasic CO2—H2O Pretreatment of Lignocellulosic Biomass", Biotechnology and Bioengineering, 107(3), 2010, 451-460 (Abstract; 1 page).
Malaluan et al., "Biomass conversion in supercritical water", Off. Proc. Comb. Conf., 6th Conf. Asia Pac. Confed. Chem. Eng., 21st Australas. Chem. Eng. Conf., vol. 1 (Publisher: Inst. Eng., Aus., Barton, Australia), 1993, 209/1-214/1 (Abstract; 1 page).
Mankar, S.S. et al., Lignin in Phenol-Formaldehyde Adhesvies. Int J Knowledge Eng. 2012; 3(1):116-8.
Mansouri, N., et al. 2006. "Structural characterization of technical lignins for the production of adhesives: Application to lignosulfonate, kraft, soda-anthraquinone, organosolv and ethanol process lignins," Industrial Crops and Products, 24(1): 8-16.
Mao, J. Z., et al. 2012. "Fractional and structural characterization of alkaline lignins from carex meyeriana Kunth," Cellulose Chemistry and Technology, 46(3), 193-205.
Marchessault et al., "A New Understanding of the Carbohydrate System", Future Sources of Organic Raw Materials, 1980, 613-625.
Marone et al., "Comminution of hydrolytic lignin in a jet mill", Gidroliznaya i Lesokhimicheskaya Promyshlennost, (6), 1991, 14-15 (Abstract; 1 page).
Marton, J. 1971. "Reaction in alkaline pulping." In: Lignins: Occurrence, formation, structure and reactions. Sarkanen, K. V. & Ludvig C. H., Eds., Wiley—Interscience, New York, 639-694.

Matsumura et al., "Supercritical Water Treatment of Biomass for Energy and Material Recovery", Combust. Sci. And Tech., 2006, 178:509-536.
Matsunaga et al., "Super-rapid chemical conversion of sugi wood by supercritical and subcritical water treatment", Mokuzai Gakkaishi, 50(5), 2004, 325-332 (Abstract; 1 page).
McCoy et al., "Extraction of Lignin from Biomass with Supercritical Alcohol", J. Supercritical Fluids, 1989, 2:80-84.
McHugh et al., "Supercritical Fluid Extraction : Principles and Practice", Butterworths, 1986, pp. 293-310.
McWilliams et al., "Comparison of aspen wood hydrolysates produced by pretreatment with liquid hot water and carbonic acid", Applied Biochemistry and Biotechnology, 98-100, 2002, 109-121 (Abstract).
Miller-Ihli et al., "Direct determination of lead in sugars using graphite furnace atomic absorption spectrometry", Atomic Spectroscopy, 14(4), 1993, 85-9.
Milne, T., et al. 1992. "Standardized analytical methods," Biomass & Bioenergy 2(1-6), 341-366.
Miyazawa et al., "Polysaccharide Hydrolysis Accelerated by Adding Carbon Dioxide under Hydrothermal Conditions", Biotechnol. Prog ., 2005, 21: 1782-1785.
Modell et al., "Supercritical Water Oxidation of Pulp Mill Sludges", Tappi J., 1992, 75:195-202.
Mok et al., "Dilute acid hydrolysis of biopolymers in a semi-batch flow reactor at supercritical pressure", Energy from Biomass and Wastes, 13, 1990, 1329-1347 (Abstract; 1 page).
Moreschi et al., "Hydrolysis of Ginger Bagasse Starch in Subcritical Water and Carbon Dioxide", Journal of Agricultural and Food Chemistry, 2004, 52(6), 1753-1758. (Abstract).
Mosier et al., "Characterization of Acid Catalytic Domains for Cellulose Hydrolysis and Glucose Degradation", Biotechnology and Bioengineering, vol. 79, No. 6, Sep. 20, 2002, 610-618.
Mosier et al., "Optimization of pH controlled liquid hot water pretreatment of corn stover", Bioresource Technology, 96(18), 2005, 1986-1992 (Abstract).
Moubarik, A. et al., Cornstarch and Tannin in Phenol-Formaldehyde Resins for Plywood Production. Indus. Crops Prod. 2009; 30:188-93.
Nakata et al., "Bioethanol from cellulose with supercritical water treatment followed by enzymatic hydrolysis", Applied Biochemistry and Biotechnology, 129-132, 2006, 476-485 (Abstract; 1 page).
Napradean et al., "Studies regarding cadmium determination by atomic absorption spectrometry. Note II. Pharmaceutical finished products", Farmacia, 53(2), 2005, 86-90 (Abstract).
Neureiter et al., "Dilute-acid hydrolysis of sugarcane bagasse at varying conditions", Applied Biochemistry and Biotechnology, 98-100, 2002, 49-58 (Abstract).
Neureiter et al., "Dilute acid hydrolysis of presscakes from silage and grass to recover hemicellulose-derived sugars", Bioresource Technology, 92(1), 2004, 21-29 (Abstract).
Nunn, et al., "Product compositions and kinetics in the rapid pyrolysis of milled wood lignin", Industrial & Engineering Chemistry Process Design and Development, vol. 24, Jul. 1985, pp. 844-852.
Ogihara et al., "Direct observation of cellulose dissolution in subcritical and supercritical water over a wide range of water densities (500-1000 kg/m3)", Cellulose, 2005, 12:595-606.
Ohra-aho, T., et al. 2013. "S/G ratio and lignin structure among Eucalyptus hybrids determined by Py-GC/MS and nitrobenzene oxidation," Journal of Analytical and Applied Pyrolysis, 101, 166-171.
Osada et al., "Low Temperature Catalytic Gasification of Lignin and Cellulose with a Ruthenium Catalyst in Supercritical Water", Energy Fuels, 2004, 18: 327-333.
Parajo et al., "Pre-hydrolysis of Eucalyptus wood with dilute sulfuric acid: operation in autoclave", Holz als Roh- and Werkstoff, 52(2), 1994, 102-8 (Abstract).
Park et al., "Kinetics of cellulose decomposition under subcritical and supercritical water in continuous flow system", Korean Journal of Chemical Engineering, 19(6), 2002, 960-966 (Abstract).
Pasquini et al., "Extraction of lignin from sugar cane bagasse and Pinus taeda wood chips using ethanol-water mixtures and carbon

(56) References Cited

OTHER PUBLICATIONS dioxide at high pressures", Journal of Supercritical Fluids, PRA Press, US, Nov. 2005, 36(1); 31-39.
Pasquini et al., "Sugar cane bagasse pulping using supercritical CO2 associated with co-solvent 1-butanol/water", J. of Supercritical Fluids, vol. 34, 2005, 125-134.
Persson et al., "Supercritical Fluid Extraction of a Lignocellulosic Hydrolysate of Spruce for Detoxification and to Facilitate Analysis of Inhibitors", Biotechnology and Bioengineering, Wiley & Sons, Hoboken, NJ, US, Sep. 20, 2002, 79(6): 694-700 (Abstract).
Pessoa, Jr. et al., "Acid hydrolysis of hemicellulose from sugarcane bagasse", Brazilian Journal of Chemical Engineering, 14(3), 1997, 291-297 (Abstract).
Peter et al., "High Pressure Extraction of Lignin from Biomass", Supercritical Fluid Technology, 1985, p. 385.
Pohl et al., "Direct determination of the total concentrations of magnesium, calcium, manganese, and iron in addition to their chemical and physical fractions in dark honeys", Analytical Letters, 44(13), 2011, 2265-2279.
Pu, Y., et al. 2011. "Application of quantitative 31P NMR in biomass lignin and biofuel precursors characterization," Energy & Environmental Science, 4, 3154-3166.
Ralph, et al., "Elucidation of new structures in lignins of CAD- and COMT-deficient plants by NMR", Phytochem. 57(6), 2001, 993-1003 (Abstract).
Ralph, J., et al. 2004. "Lignins: natural polymers from oxidative coupling of 4-hydroxphenylpropanoids," Phytochem. Rev. 3, 29-60.
Ramirez et al., "Mathematical modelling of feed pretreatment for bioethanol production", Computer-Aided Chemical Engineering, vol. 26, 2009, 1299-1304 (Abstract).
Rao et al., "Pyrolysis Rates of Biomass Materials", Energy, 1998, 23:973-978.
Robert, D., et al. 1988. "Structural changes in aspen lignin during steam explosion treatment," Cellulose Chem. Techn., 22, 221-230.
Roberto et al., "Dilute-acid hydrolysis for optimization of xylose recovery from rice straw in a semi-pilot reactor", Industrial Crops and Products, 17(3), 2003, 171-176 (Abstract).
Röhrling et al., A Novel Method for the Determination of Carbonyl Groups in Cellulosics by Fluorescence Labeling. 2. Validation and Applications. Biomacromolecules. 2002; 3:969-75.
Saito et al., "The Investigation of Degradation Reaction of Various Saccharides in High Temperature and High Pressure Water", Journal of Physics:Cinference Series, 2008, 121 (2 pages).
Saka, "Supercritical fluids to biomass research", Cellulose Communications, 5(3), 1998, 129-135 (Abstract).
Saka et al., "Chemical conversion of biomass resources to useful chemicals and fuels by supercritical water treatment", Bridgewater AV(ed) Progress in Thermocritical Biomass Conversion. Blackwell, Oxford, 2001, 1338-1348.
Saka et al., "Chemical conversion of various celluloses to glucose and its derivatives in supercritical water", Cellulose Communications, 6(3), 1999, 177-191.
Saka et al., "Supercritical fluids to biomass research (II)", Cellulose Communications, 9(3), 2002, 137-143 (Abstract).
Sakakibara, A. 2001. "Chemistry of lignin." In: Wood and Cellulose Chemistry. Hon, D.N.-S., Shiraishi, N., Eds., Marcel Dekker Inc., New York, 109-173.
Sako, "Kinetic study of furfural formation accompanying supercritical carbon dioxide extraction", Journal of Chemical Engineering of Japan, Society of Chemical Engineers, Aug. 1, 1992, 25(4):372-377.
Sanchez et al., "Dilute-acid hydrolysis for fermentation of the Bolivian straw material Paja Brava", Bioresource Technology, 93(3), 2004, 249-256 (Abstract).
Sangarunlert et al., "Furfural production by acid hydrolysis and supercritical carbon dioxide extraction from rice husk", Korean Journal of Chemical Engineering, 2007, 24(6): 936-941.
Santos, R., et al. 2012. "Lignin structural variations in hardwood species," J. Agric. Food Chem., 60, 4923-4930.
Sarrouh et al., "Biotechnological production of xylitol: enhancement of monosaccharide production by post-hydrolysis of dilute acid sugarcane hydrolysate", Applied Biochemistry and Biotechnology, 153(1-3), 2009, 163-170 (Abstract).
Sasaki et al., "Cellulose Hydrolysis in Sub-Critical and Supercritical Water", Journal of Supercritical Fluids, 1998, 13:261-268.
Sasaki et al., "Direct hydrolysis of cellulose to glucose using ultra-high temperature and pressure steam explosion", Carbohydrate Polymers 89, 2012, 298-301. (Abstract).
Sasaki et al., "Dissolution and Hydrolysis of Cellulose in Subcritical and Supercritical Water", Industrial & Engineering Chemistry Research, 39(8), 2000, 2883-2890.
Sasaki et al., "Kinetics of cellulose conversion at 25 MPa in sub-and supercritical water", AIChE Journal, 50(1), 2004, 192-202.
Sasaki et al., "Rapid and selective conversion of cellulose to valuable chemical intermediates using supercritical water", Proc. 6th international Symposium on Supercritical Fluids, Tome 2, 2003, 1417-1422.
Sasaki et al., "Super-rapid enzymatic hydrolysis of cellulose with supercritical water solubilization pretreatment", Kobunshi Ronbunshu, 58(10), 2001, 527-532 (Abstract).
Saucedo-Luna et al., "Optimization of acid hydrolysis of bagasse from Agave tequilana Weber", Revista Mexicana de Ingenieria Quimica, 9(1), 2010, 91-97 (Abstract).
Schacht et al., "From plant materials to ethanol by means of supercritical fluid technology", J. of Supercritical Fluids, vol. 46, 2008, 299-321.
Segal, L. et al., An Empirical Method for Estimating the Degree of Crystallinity of Native Cellulose Using the X-Ray Diffractometer. TexRes J. 1959; 29(10):786-94 (Abstract; 2 pages).
Sera et al., "Development of saccharification techniques for cellulosic biomass", Hitz Giho, 68(2), 2008, 40-45 (Abstract).
Shikinaka et al., "Polyfunctional nanometric particles obtained from lignin, a woody biomass resource", Green Chemistry, 12(11), 2010, 1914-1916 (Abstract).
Sina et al., "Key Compounds of the Hydropyrolysis of Glucose in Supercritical Water in the Presence of K2CO3", Ind. Eng. Chem. Res., 2003, 42(15), 3516-3521 (Abstract).
Sluiter, et al., "Determination of Ash in Biomass", Laboratory Analytical Procedure, National Renewable Energy Laboratory, downloaded from http://www.astm.org/Standards/ E1755.htm, Jul. 17, 2005 (8 pages).
Smit, R., et al. 1997. "A new method for the quantification of condensed and uncondensed softwood lignin structures," Proc. 9th Intern. Symp. Wood Pulping Chem., Montreal, Canada., L4-1-L4-6.
Soederstroem et al., "Effect of Washing on Yield in One- and Two-Step Steam Pretreatment of Softwood for Production of Ethanol", Biotechnology Progress, 20(3), 2004, 744-749 (Abstract).
Sokolov et al., "Activation of hydrolytic lignin obtained from corncobs", Kozharska i Obuvna Promishlenost, 13(6), 1972, 13-23 (Abstract).
Spigno et al., "Cellulose and hemicelluloses recovery from grape stalks", Bioresource Technology, 99(10), 2008, 4329-4337 (Abstract).
Springer, "Prehydrolysis of hardwoods with dilute sulfuric acid", Industrial & Engineering Chemistry Product Research and Development, 24(4), 1985, 614-23 (Abstract).
Srinivasan et al., "Pretreatment of Guayule Biomass Using Supercritical Carbon Dioxide-Based Method", Bioresource Technology, 101(24), 2010, 9785-9791 (Abstract).
Srokol et al., "Hydrothermal upgrading of biomass to biofuel; studies on some monosacchride model compounds", Carbohydrate Research, 339(10), 2004, 1717-1726 (Abstract).
Standard Test Method for Strength Properties of Adhesives in Plywood Type Construction in Shear by Tension Loading. ASTM International. 2004; D 906-98.
Steinke, "Valve solutions for high-pressure letdown", Proceedings of the Symposium on Instrumentation for the Process Industries, 44th, 1989, 39-43 (Abstract).
Steinke et al., "Valve solutions for high pressure letdown", Advances in Instrumentation, 42(3), 1987, 1381-1390 (Abstract).
Strobel et al., "Carbohydrate Transport by the Anaerobic Thermophile Clostridium thermocellum LQRI", Applied and Environmental Microbiology, Nov. 1995, 4012-4015.

(56) References Cited

OTHER PUBLICATIONS

Suitor et al., "Development of a coal slurry letdown valve", American Society of Mechanical Engineers, Fluids Engineering Division, vol. 23, 1985, 142-144 (Abstract).
Sukhanovskii et al., "The chemical composition of the organic part and of ash in hydrolysis lignins", Gidroliznaya i Lesokhimicheskaya Promyshlennost, 18(5), 1965, 15-17 (Abstract).
Sun, S., et al. 2012. "Sequential extractions and structural characterization of lignin with ethanol and alkali from bamboo (*Neosinocalamus affinis*)," Industrial Crops and Products, 37(1), 51-60.
Sun, X., et al. 2005. "Physicochemical characterization of lignin isolated with high yield and purity from wheat straw," International Journal of Polymer Analysis and Characterization, 9, 317-337.
Svitel'Skii, "Study of ash in lignin from kraft mill effluents", Mater. Nauch.—Tekh. Konf. Leningrad. Lesotekh. Akad., No. 4, 1966, 180-185 (Abstract).
Terol et al., "High-temperature liquid chromatography inductively coupled plasma atomic emission spectrometry hyphenation for the combined organic and inorganic analysis of foodstuffs", Journal of Chromatography, 1217(40), 2010, 6195-6202.
Trickett et al., "Dilute acid hydrolysis of bagasse hemicellulose", ChemSA, 8(3), 1982, 11-15 (Abstract).
Um et al., "Acid Hydrolysis of Hemicellulose in Green Liquor Pre-Pulping Extract of Mixed Northern Hardwoods", Appl. Biochem Biotechnol,153(1-3), 2009, 127-38.
Van Walsum, "Severity function describing the hydrolysis of xylan using carbonic acid", Applied Biochemistry and Biotechnology, 91-93, 2001, 317-329 (Abstract).
Van Walsum et al., "Carbonic acid enhancement of hydrolysis in aqueous pretreatment of corn stover", Bioresource Technology, 93(3), 2004, 217-226 (Abstract).
Vanderlaan, M. & R. Thring. 1998. "Polyurethanes from Alcell lignin fractions obtained by sequential solvent extraction," Biomass & Bioenergy, 14, 525-531.
Varga et al., "Optimization of steam pretreatment of corn stover to enhance enzymatic digestibility", Applied Biochemistry and Biotechnology, 113-116, 2004, 509-523 (Abstract).
Veres et al., "Studies on matrix effects in the determination of the metal content of sugar complexes by atomic absorption spectrometry", Magyar Kemiai Folyoirat, 93(5), 1987, 199-204 (Abstract).
Vick Roy et al., "Biomass hydrolysis with sulfur dioxide and water in the region of the critical point", Process Technology Proceedings, 3 Supercrit. Flud Technol., 1985, 397-444 (Abstract).
Wallis, A. F. A. 1971. "Solvolysis by acids and bases." In: Lignins: Occurrence, formation, structure and reactions. Sarkanen, K.V., et al., Eds., 345-372.
Wiboonsiriku et al., "Properties of Extracts from Defatted Rice Bran by its Subcritical Water Treatment", Journal of Agricultural and Food Chemistry, 2007, 55(21), 8759-8765.
Wu et al., "Determination of trace calcium in glucose by Zeeman flame atomic absorption spectrometry", Guangdong Weiliang Yuansu Kexue, 14(3), 2007, 58-60 (Abstract; 4 pages).
Wörmeyer, K., et al. 2011. "Comparison of different pretreatment methods for lignocellulisic materials. Part II: Influence of pretreatment on the properties of rye straw lignin," Bioresource Technology, 102, 4157-4164.
Xia, Z., et al. 2001. "Quantitative 13C NMR of lignins with internal standards," Journal of Agricultural and Food Chemistry, 49, 3573-3578.
Yan, Z., et al. 2007. "Supercritical/subcritical technology for pretreatment and hydrolyzation of stalks," Progress in Chemistry, 19(11), 13/45-19/45.
Yee et al., "Improvement of xylose production by acid hydrolysis of bagasse pith with low liquor ratio", Taiwan Tangye Yanjiuso Yanjiu Huibao, 98, 1982, 59-70 (Abstract).
Yoshida et al., "Gasification of Biomass Model Compound and Real Biomass in Supercritical Water", Biomass and Bioenergy, 2004, 26:71-78.

Yu et al., "Characteristics and Precipitation of Glucose Oligomers in the Fresh Liquid Products Obtained from the Hydrolysis of Cellulose in", Hot-Compressed Water, Industrial & Engineering Chemistry Research, 48(23), 2009, 10682-10690 (Abstract).
Zakis, G. 1994. Functional analysis of lignins and their derivatives. Tappi Press, Atlanta, Georgia.
Zawadzki, M. & Ragauskas, A. 2001. "N-Hydroxy compounds as new internal standards for the 31P-NMR determination of lignin hydroxyl functional groups," Holzforschung, 55, 283-285.
Zhang et al., "Cellulose utilization by Clostridium thermocellum: Bioenergetics and hydrolysis product assimilation", PNAS, May 17, 2005, 7321-7325.
Zhang, et al., "Lignocellulosic ethanol residue-based lignin-phenol-formaldehyde resin adhesive", International Journal of Adhesion & Adhesives, vol. 40, 2013, 11-18.
Zhang, et al., "Preparation and properties of lignin-phenol-formaldeyde resins based on different biorefinery residues of agricultural biomass", Industrial Crops and Products, vol. 43, 2013, 326-333.
Zhang, L. & G. Gellerstedt. 2007. "Quantitative 2D HSQC NMR determination of polymer structures by selecting suitable internal standard references," Magnetic Resonance in Chemistry, 45(1), 37-45.
Zhao et al., "Combined supercritical and subcritical process for cellulose hydrolysis to fermentable hexoses", Environmental Science & Technology, 43(5), 2009, 1565-1570.
Zhao et al., "Fermentable hexose production from corn stalks and wheat straw with combined supercritical and subcritical huydrothermal technology", Bioresource Technology, 100(23), 2009, 5884-5889 (Abstract).
Zhao et al., "Supercritical hydrolysis of cellulose for oligosaccharide production in combined technology", Chemical Engineering Journal, Aug. 1, 2009, 150(2):411-417.
Zhao et al., "Supercritical pretreatment and hydrolysis of cellulose", Huaxue Xuebao, 66(20), 2008, 2295-2301 (Abstract).
Zhuang et al., "Research on biomass hydrolysis under extremely low acids by HPLC." Taiyangneng Xuebao. 2007; 28(11):1239-43 (Abstract).
Zuckerstätter, G. et al., The Elucidation of Cellulose Supramolecular Structure by 13C CP-MAS NMR. Lenzinger Berichte. 2009; 87:38-46.
International Search Report and Written Opinion dated Feb. 20, 2013 by the International Searching Authority for Patent Application No. PCT/US2012/067535, which was filed on Dec. 3, 2012 and published as WO 2013/101397 (Inventor—Kilambi et al.; Applicant—Renmatix, Inc.; (8 pages).
Non-Final Office Action dated Jan. 27, 2015 by the U.S. Patent and Trademark Office for U.S. Appl. No. 14/048,935, filed Oct. 8, 2013 and now U.S. Pat. No. 9,255,188 on Feb. 9, 2016 (Kilambi et al.; Applicant—Renmatix, Inc.; (18 pages).
Final Office Action dated Jun. 19, 2015 by the U.S. Patent and Trademark Office for U.S. Appl. No. 14/048,935, filed Oct. 8, 2013 and now U.S. Pat. No. 9,255,188 on Feb. 9, 2016 (Kilambi et al.; Applicant—Renmatix, Inc.; (9 pages).
Advisory Action dated Aug. 25, 2015 by the U.S. Patent and Trademark Office for U.S. Appl. No. 14/048,935, filed Oct. 8, 2013 and now U.S. Pat. No. 9,255,188 on Feb. 9, 2016 (Kilambi et al.; Applicant—Renmatix, Inc.; (4 pages).
Notice of Allowance dated Oct. 2, 2015 by the U.S. Patent and Trademark Office for U.S. Appl. No. 14/048,935, filed Oct. 8, 2013 and now U.S. Pat. No. 9,255,188 on Feb. 9, 2016 (Kilambi et al.; Applicant—Renmatix, Inc.; (7 pages).
Issue Notification dated Jan. 20, 2016 by the U.S. Patent and Trademark Office for U.S. Appl. No. 14/048,935, filed Oct. 8, 2013 and now U.S. Pat. No. 9,255,188 on Feb. 9, 2016 (Kilambi et al.; Applicant—Renmatix, Inc.; (1 page).
Non-Final Office Action dated Mar. 1, 2017 by the U.S. Patent and Trademark Office for U.S. Appl. No. 14/976,796, filed Dec. 21, 2015 and published as US 2016/0108182 on Apr. 21, 2016 (Kilambi et al.; Applicant—Renmatix, Inc.; (15 pages).
Final Office Action dated Aug. 30, 2017 by the U.S. Patent and Trademark Office for U.S. Appl. No. 14/976,796, filed Dec. 21,

(56) References Cited

OTHER PUBLICATIONS 2015 and published as US 2016/0108182 on Apr. 21, 2016 (Kilambi et al.; Applicant—Renmatix, Inc.; (7 pages).

International Search Report and Written Opinion dated Nov. 30, 2015 by the International Searching Authority for Patent Application No. PCT/US2015/052438, which was filed on Sep. 25, 2015 and published as WO 2016/049569 on Mar. 31, 2016 (Inventor—Capanema et al.; Applicant—Renmatix, Inc.; (10 pages).

International Preliminary Report on Patentability dated Mar. 28, 2017 by the International Searching Authority for Patent Application No. PCT/US2015/052438, which was filed on Sep. 25, 2015 and published as WO 2016/049569 on Mar. 31, 2016 (Inventor—Capanema et al.; Applicant—Renmatix, Inc.; (8 pages).

European Search Report dated Apr. 20, 2018 by the European Patent office for EP Application No. 15845379.5, filed Sep. 25, 2015, and published as EP 3186326 on Jul. 5, 2017 (Applicant—Renmatix Inc.) (7 pages).

Veigel, et al: "Cellulose nanofibrils as filler for adhesives: effect on specific fracture energy of solid wood-adhesive bonds", Cellulose, vol. 18, No. 5, Jul. 15, 2011 (Jul. 15, 2011), pp. 1227-1237.

Yang et al., "Steaming Extraction of Corncob Xylan for Production of Xylooligosaccharide", Wuxi Qinggong Daxue Xuebao, 17(4), 1998, 50-53 (Abstract).

Yang et al., "Extraction of Corncob Xylan for Production of Xylooligosaccharides by Steaming", Wuxi Qinggong Daxue Xuebao, 17(4), 1998, 50-53 (Abstract).

Office Action dated Dec. 23, 2019 by the Brazilian Patent Office for BR Application No. BR1120170060124, filed on Sep. 25, 2015 (Applicant—Renmatix, Inc.) (4 Pages).

Office Action dated Dec. 30, 2019 by the Indian Patent Office for IN Application No. 201737008306, filed on Sep. 25, 2015 (Applicant—Renmatix, Inc.) (6 Pages).

\* cited by examiner

ADHESIVE COMPOSITIONS COMPRISING TYPE-II CELLULOSE

CROSS-REFERENCE TO RELATED APPLICATIONS

This application is a U.S. National Phase Application of International Application No. PCT/US2015/052438, filed Sep. 25, 2015, which claims the benefit of U.S. Provisional Application No. 62/056,072 filed Sep. 26, 2014, the entire disclosures of which are incorporated herein by reference.

FIELD OF THE INVENTION

The present invention generally relates to compositions, which are useful as adhesives, especially for engineered wood products. More particularly, it relates to compositions comprising type-II cellulose, and in some embodiments, lignin.

BACKGROUND OF THE INVENTION

Phenol-formaldehyde (PF) resins are commonly used adhesives in engineered wood products, including plywood and oriented strand board (OSB), because of their weather and water resistance, making them suitable for exterior applications.

Phenols used in making PF resins are typically derived from petrochemicals and, as a result, can be too costly for use and may be undesirable from an environmental perspective. It would be desirable to employ compounds that reduce the overall amount of phenol demand to decrease costs and improve the adhesive resins from an environmental standpoint. Several attempts have been made to employ lignin in adhesive resins to decrease overall phenol use, since lignin contains moieties structurally similar to phenol, and lignin is a renewable material (see, for example, U.S. Pat. No. 4,303,562 to J. W. Hollis, Jr. et al).

Most conventional technical lignins are a byproduct of the pulping industry, and different pulping processes affect the types and amounts of chemical functionalities present in lignin. Despite this array of structural differences, as well as the varying purity of the materials, among other factors, the technical lignins studies to date do not perform acceptably in adhesives. Thus, there remains a need in the art for improved adhesive compositions made from or containing renewable materials. The present invention addresses this need.

BRIEF SUMMARY OF THE INVENTION

The present invention generally relates to admixtures and compositions useful as adhesives, especially for wood products. In particular, disclosed herein are admixtures comprising an adhesive resin and cellulose, in which at least a portion of the cellulose is type-II cellulose.

Also disclosed herein are compositions comprising an adhesive resin, in which the adhesive resin comprises a condensation product of formaldehyde and at least one phenolic compound, wherein the condensation product is formed in the presence of cellulose, and at least a portion of the cellulose is type-II cellulose.

Further disclosed herein are wood products, particularly engineered wood products, such as plywood and oriented strand board, comprising cured admixture and/or cured composition, as described herein.

BRIEF DESCRIPTION OF THE DRAWINGS

The accompanying drawings, which are included to provide a further understanding of the invention and are incorporated in and constitute a part of this specification, illustrate aspects of the invention and together with the description serve to explain the principles of the invention. The abbreviations used herein are described fully in the Detailed Description of the Invention section, except the abbreviations used to represent the residues comprising lignin and the residues comprising lignin and cellulose are presented in Example 1. In the drawings.

DETAILED DESCRIPTION OF THE INVENTION

Figure 1:
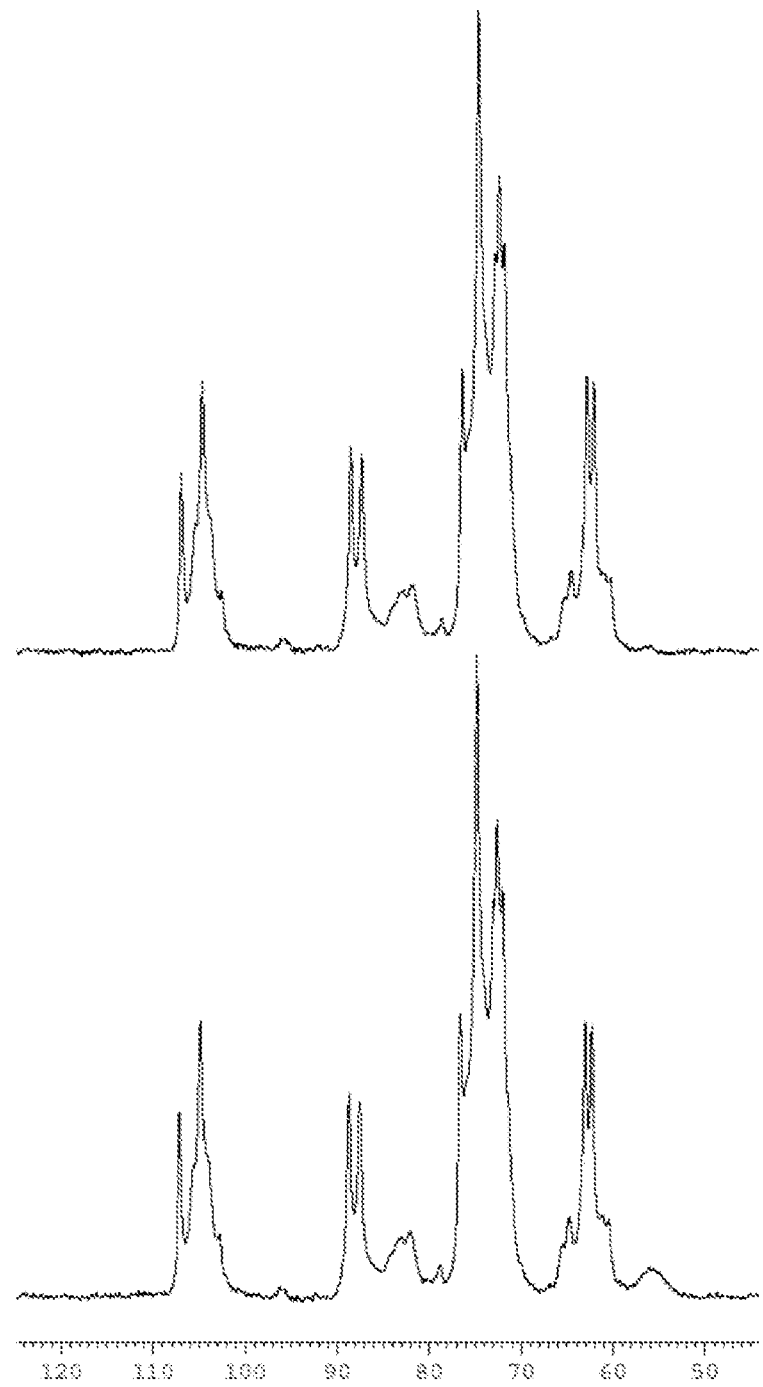
FIG. 1 shows the $^{13}C$ CP-MAS NMR spectrum for SHR-50 (see Example 1).

As employed above and throughout the disclosure, the following terms, unless otherwise indicated, shall be understood to have the following meanings.

As used herein, the phrase "substantially free" (of a component) means have no more than about 1%, preferably less than about 0.5%, more preferably, less than about 0.1%, by weight of the component, based on the total weight of any composition containing the component.

As used herein, the singular forms "a," "an," and "the" include the plural reference unless the context clearly indicates otherwise.

While the present invention is capable of being embodied in various forms, the description below of several embodiments is made with the understanding that the present disclosure is to be considered as an exemplification of the invention, and is not intended to limit the invention to the specific embodiments illustrated. Headings are provided for convenience only and are not to be construed to limit the invention in any manner. Embodiments illustrated under any heading may be combined with embodiments illustrated under any other heading.

The use of numerical values in the various quantitative values specified in this application, unless expressly indicated otherwise, are stated as approximations as though the minimum and maximum values within the stated ranges were both preceded by the word "about." In this manner, slight variations from a stated value can be used to achieve substantially the same results as the stated value. Herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. That is, the disclosure of ranges is intended as a continuous range including every value between the minimum and maximum values recited as well as any ranges that can be formed by such values. Also disclosed herein are any and all ratios (and ranges of any such ratios) that can be formed by dividing a recited numeric value into any other recited numeric value. Accordingly, the skilled person will appreciate that many such ratios, ranges, and ranges of ratios can be unambiguously derived from the numerical values presented herein and in all instances such ratios, ranges, and ranges of ratios represent various embodiments of the present invention.

Herein, the PF replacement level is the amount of PF resin (weight of solids) that is replaced by an equal amount (weight of solids) of a lignin, cellulose, or lignin and cellulose component. For example, a 30% replacement level of PF resin with an SHR residue would have a 70 PF/30 SHR ratio by weight of solids of the two components.

Herein, "wt. %" of a component Z in a composition or admixture, unless expressly stated to the contrary, means weight percent of Z based on solids; i.e. solid weight of component Z as a percentage of the weight of total solids of the composition or admixture.

A supercritical fluid is a fluid at a temperature above its critical temperature and at a pressure above its critical pressure. A supercritical fluid exists at or above its "critical point," the point of highest temperature and pressure at which the liquid and vapor (gas) phases can exist in equilibrium with one another. Above critical pressure and critical temperature, the distinction between liquid and gas phases disappears. A supercritical fluid possesses approximately the penetration properties of a gas simultaneously with the solvent properties of a liquid. Accordingly, supercritical fluid extraction has the benefit of high penetrability and good solvation.

Reported critical temperatures and pressures include: for pure water, a critical temperature of about 374.2° C., and a critical pressure of about 221 bar; for carbon dioxide, a critical temperature of about 31° C. and a critical pressure of about 72.9 atmospheres (about 1072 psig). Near critical water has a temperature at or above about 300° C. and below the critical temperature of water (374.2° C.), and a pressure high enough to ensure that all fluid is in the liquid phase. Sub-critical water has a temperature of less than about 300° C. and a pressure high enough to ensure that all fluid is in the liquid phase. Sub-critical water temperature may be greater than about 250° C. and less than about 300° C., and in many instances sub-critical water has a temperature between about 250° C. and about 280° C. The term "hot compressed water" is used interchangeably herein for water that is at or above its critical state, or defined herein as near-critical or sub-critical, or any other temperature above about 50° C. (preferably, at least about 100° C.) but less than subcritical and at pressures such that water is in a liquid state.

Biomass is a renewable energy source generally comprising carbon-based biological material derived from living or recently-living organisms. The organisms are or may have been plants, animals, fungi, etc. Examples of biomass include without limitation wood, lignocelluiosic biomass, municipal solid waste, manufacturing waste (wood discards such as sawmill and paper mill discards), agricultural waste (including corn stover, sugarcane bagasse, rice hulls, oat hulls, etc.), food waste, black liquor (a byproduct of wood pulping processes), etc. Wood can be, for example, hardwood, softwood, annual fibers, and combinations thereof. Biomass typically comprises cellulose, hemicellulose, and lignin. Any suitable type of biomass can be used as a feedstock for the inventive lignin described herein. Fossil fuels are generally not considered biomass even though ultimately derived from carbon-based biological material. The term "biomass" as used herein does not include fossil fuel sources.

As used herein, a "residue" refers to the solid material portion remaining after treatment of lignoceliulosic biomass by processing with sub-critical, near-critical, or supercritical fluid comprising water. "Residue" includes both: (1) the solid residue when isolated (e.g, separated) from a liquid fraction; and (2) the solid residue when present with liquid fractions, such as (a) in the form of a slurry obtained after a treatment (e.g., before liquid fraction is removed); (b) in the form of a slurry after further processing (e.g., where additional liquid may be added or the solids partially solubilized, for example, with base), or (c) in the form of a solution (e.g., after treatment to form a solid, but after further processing to form a solution). In some embodiments, the residue is the solid portion (which may have some residual liquid in it) remaining after supercritical hydrolysis of lignocellulosic biomass As used herein, "cured" means the result of the application of sufficient heat and/or pressure and/or time, acid or base catalysis, or a reaction with crosslinking chemicals, such as cyclic carbonates or epoxy compounds, or by combinations thereof, to crosslink or set the composition. Curing typically is performed when the admixture or composition is at its point of end use, for example, joining pieces of wood together (e.g., to form plywood or OSB).

As used herein, "extender" refers to a substance added to an admixture, adhesive, or composition, for example, to optimize bulk, weight, viscosity, opacity, and/or strength. An extender may also be employed to save on costs by reducing the required amount of a component material (e.g., PF resin) in the admixture, adhesive, or composition. Suitable extenders for use in admixtures, adhesives, compositions, articles of manufacture, and processes of the invention, include, but are not limited to, starch, wheat flour, corncob flour, chalk, sodium carbonate (soda ash), potassium carbonate, calcium carbonate, ammonium sulfate, wood powder, wood bark flour (such as Super Bond branded products), quebracho, glass beads, silica, and mixtures thereof. As used herein, "extenders" do not include lignin or cellulose.

Herein "cooked" or "cooking" refers to the process of forming the adhesive resin, such as, for example, the formation of the condensation product of formaldehyde and at least one phenolic compound, whether by catalysis, heat, or any other suitable means to form the condensation product.

As used herein, an "admixture" is a composition (a mixture) that is produced by mixing two or more components. Herein, "an admixture comprising an adhesive resin and cellulose" means that the cellulose is mixed with and dispersed in the adhesive resin, in a pre-cured mixture and in the absence of "cooking," since the adhesive resin has already been formed. Specifically, the term "admixture" does not include adhesive applied to the surface of a non-particle substrate.

Cellulose can comprise a number of crystalline structures. Natural cellulose, known as a type-I cellulose, can comprise $I_\alpha$ and $I_\beta$ structures. The amount of $I_\alpha$ and $I_\beta$ structures depends on the type of the natural cellulose. For example and without limitation, the cellulose produced by bacteria and algae may be enriched in $I_\alpha$, while cellulose of plants consists mainly of $I_\beta$. Type-I cellulose may be converted to a stable crystalline form of cellulose known as a type-II cellulose. The conversion of the type-I cellulose to the type-II cellulose may be achieved by different routes, for example and without limitation, by mercerization (alkali treatment), regeneration (solubilization followed by recrystallization), subcritical and supercritical water, ball milling of cellulose in presence of water and the like. As one of ordinary skill in the art would readily appreciate, the different crystalline phases of the cellulose product may be analyzed using X-ray diffraction (XRD). The specific XRD pattern of a crystalline solid reflects the crystal structure. Using Cu K$\alpha$ radiation, the XRD spectrum of the type-I cellulose show two peaks at 2$\theta$: a primary peak around 22.5° and a secondary peak around 15.5°. The XRD spectrum of the type-II cellulose shows a primary peak at 2$\theta$ around 19.9° and a secondary peak around 12.1°

The present invention generally relates to admixtures and compositions useful as adhesives, especially for wood products (wood adhesives). A wood adhesive is capable of bonding with wood and/or capable of bonding two (or more) pieces of wood or wood strands. Herein, the term "wood adhesive" does not include a molding composition, since the technical requirements of effective operation are very different. In particular, disclosed herein are admixtures comprising an adhesive resin and cellulose, in which at least a portion of the cellulose is type-II cellulose.

Suitable adhesives used in engineered wood products, including plywood and oriented strand board (OSB), include a variety of thermoset polymers. Two types of resins are particularly dominant for use in these engineered wood products: phenol-formaldehyde (PF) and poly(diphenylmethane diisocyanate) (pMDI or MDI), and both are suitable in the present invention. Amino resins are also suitable, for example, urea-formaldehyde (UF), melamine-formaldehyde (MF), melamine-urea-formaldehyde (MUF), phenol-urea-formaldehyde (PUF), melamine-urea-phenol-formaldehyde (MUPF), phenol-melamine-urea-formaldehyde (PMUF), guanamine-formaldehyde, benzoguanamine-formaldehyde, and aceto-guanamine-formaldehyde as known in the art. Other amine-bearing materials may be used to form analogous amino resins by similar techniques, including glycoluril, thiourea, aniline, and paratoluene sulfonamide. Epoxy resins, unsaturated polyesters, and combinations or hybrid resins of the aforementioned resins, such as a pMDI/PF or pMDI/UF resin are also suitable. PF resins are preferred for exterior applications. In some embodiments of the invention, the cellulose component can be incorporated into an adhesive in combination with lignin. In some embodiments, the cellulose and lignin are incorporated separately into an adhesive. In some embodiments, the cellulose and lignin are present as a mixture and are added to an adhesive as the mixture. In some embodiments, the cellulose is present in a residue along with lignin resulting from biomass processing (e.g., using hot compressed water, supercritical water, acid hydrolysis, enzymatic hydrolysis, or any combination thereof). In some embodiments, the cellulose is first separated from this residue (e.g., separated from lignin) prior to incorporating the cellulose (or a portion thereof) into an adhesive. In some embodiments, the cellulose is not separated from the residue containing lignin prior to incorporation of the residue into an adhesive. In some embodiments, both the cellulose (or a portion thereof) and residue can be added to an adhesive.

The cellulose, the residue containing cellulose, or a combination thereof can be added to an adhesive in two different ways: (1) before "cooking" an adhesive to form a resin, or (2) after "cooking" (i.e., added after the resin has been formed by cooking). Combinations of (1) and (2) are also possible.

Condensation products of the reaction of a phenolic compound and formaldehyde can be either potentially thermosetting (also known as "resols") or thermoplastic (also known as "novolacs"). A resol is formed when formaldehyde is used in molar excess under (normally) alkaline conditions, while a novolac is formed when phenol is used in molar excess under (normally) acid conditions. By reacting with sufficient additional formaldehyde under alkaline conditions, it is possible to convert a novolac to a resol. A two-stage resol prepared in this way differs in certain physical properties, such as intrinsic viscosity, from a resol made by direct reaction of phenol and formaldehyde under alkaline conditions.

PF resins of the resol type typically are produced by condensation of a phenolic compound (e.g., phenol) and formaldehyde, typically at 80-95° C. in the presence of a base (e.g., NaOH) to produce polymeric PF resin, which then may be used as adhesive for production of various engineered wood products. When preparing engineered wood products, adhesive and wood can be pressed together under heating ("hot press") in order to create the engineered wood product. Type-II cellulose (optionally in combination with lignin) can be used to form compositions in at least two different ways. In option (1), type-II cellulose (and optionally lignin) is present during the polymerization of the at least one phenolic compound and formaldehyde to form the resin, and the type-II cellulose may or may not be incorporated into the resin structure. If lignin is also present along with the type-II cellulose, then the lignin may be incorporated into the polymeric resin structure due to the phenolic moieties on lignin. In option (2), type-II cellulose (and optionally lignin) is added after the resin has already been polymerized. In this option, the type-II cellulose (and lignin, if present), are simply admixed with the already-formed resin, and therefore the cellulose and lignin are not incorporated into the resin structure in option (2), absent any heating and/or addition of a catalyst that would favor such reaction. These compositions formed in options (1) and (2) are the compositions that are formed prior to any curing of the compositions, for example, as wood adhesives when making engineered wood products, such as plywood and OSB.

When employing formaldehyde and at least one phenolic compound to form a resin (i.e., a PF resin), the formaldehyde reacts with the at least one phenolic compound at the ortho or para sites (if available) to form a hydroxymethyl phenol moiety. The hydroxymethyl phenol moiety then reacts with either another free ortho or para site to form a methylene bridge, or with another hydroxymethyl group to form an ether bridge. These reactions continue, forming oligomers and/or polymers. In option (1) above, the type-II cellulose (and optionally lignin) is/are added during this polymerization/oligomerization process. In some embodiments of option (1), the lignin is the at least one phenolic compound added for the polymerization/oligomerization reaction. In some embodiments of option (1), the lignin is added in addition to the at least one phenolic compound (e.g., phenol) for the polymerization/oligomerization reaction. In one such embodiment, the lignin is pre-reacted with phenol ("phenolation") and then "cooked" with formaldehyde. In some embodiments of option (1), for the polymerization/oligomerization reaction, the type-II cellulose and lignin are added as a residue of lignocellulosic biomass processing.

In option (2) above, the type-II cellulose (and optionally lignin) are added to the oligomers and polymers after they have been formed (i.e., not during the polymerization/oligomerization). In some embodiments of option (2), however, the admixture of the type-II cellulose, optionally lignin, and the pre-formed oligomers and polymers may be heated, for example, to react the type-II cellulose and/or optional lignin with any free binding sites on the oligomers, polymers, or starting materials, prior to any curing. A further embodiment of option (2) includes the addition of lignin only (without cellulose) during the polymerization/oligomerization reaction of the at least one phenolic compound and formaldehyde to form the resin, followed by addition of type-II cellulose and optionally lignin after the polymerization/oligomerization reaction is finished or substantially finished according to option (2). In this latter embodiment of option (2), the lignin may be the at least one phenolic compound added for the polymerization/oligomerization reaction; or, alternatively, the lignin may be added in addition to the at least one phenolic compound (e.g., phenol) for the polymerization/oligomerization reaction. In one such embodiment, the lignin is pre-reacted with phenol ("phenolation") and then "cooked" with formaldehyde. In some embodiments of option (2), the type-II cellulose and lignin are added as a residue of lignocellulosic biomass processing.

Some embodiments envision a combination of options (1) and (2), such as adding the type-II cellulose and optionally lignin during the polymerization/oligomerization reaction according to option (1), and also adding type-II cellulose and optionally lignin after the polymerization/oligomerization reaction is finished or substantially finished according to option (2), either in two discrete steps, or in several steps up to and including continuous addition as the polymerization reaction transitions to being complete. Another embodiment includes the addition of type-II cellulose and optionally lignin during the polymerization/oligomerization reaction according to option (1), and then adding lignin (without cellulose) after the polymerization/oligomerization reaction is finished or substantially finished according to option (2).

Suitable phenolic compounds include, for example, phenol, catechol, resorcinol, tannins, or any combination thereof. In general, phenolic compounds that have positions available to react and crosslink are suitable for use.

The amount of cellulose in the adhesive admixture or in the wood adhesive (weight % of cellulose solids based on total weight of adhesive admixture solids or wood adhesive solids) can be at least about 1 wt. %, e.g., at least about 2 wt. %, at least about 4 wt. %, at least about 6 wt. %, at least about 8 wt. %, at least about 10 wt. %, at least about 12 wt. %, at least about 14 wt. %, at least about 16 wt. %, at least about 18 wt. %, at least about 20 wt. %, at least about 22 wt. %, at least about 24 wt. %, at least about 26 wt. %, at least about 28 wt. %, at least about 30 wt. %, at least about 32 wt. %, at least about 34 wt. %, at least about 36 wt. %, at least about 38 wt. %, at least about 40 wt. %, at least about 50 wt. %, or at least about 60 wt. %, based on the total weight of the adhesive on a dry basis. Alternatively, or in addition, the amount of cellulose in the adhesive admixture or in the wood adhesive (weight % of cellulose solids based on total weight of adhesive admixture solids or wood adhesive solids) can be less than about 60 wt. %, e.g., less than about 50 wt. %, less than about 40 wt. %, less than about 38 wt. %, less than about 36 wt. %, less than about 34 wt. %, less than about 32 wt. %, less than about 30 wt. %, less than about 28 wt. %, less than about 26 wt. %, less than about 24 wt. %, less than about 22 wt. %, less than about 20 wt. %, less than about 18 wt. %, less than about 16 wt. %, less than about 14 wt. %, less than about 12 wt. %, less than about 10 wt. %, less than about 8 wt. %, less than about 6 wt. %, less than about 4 wt. %, or less than about 2 wt. %, based on the total weight of the adhesive on a dry basis. The amount of cellulose in the adhesive admixture or wood adhesive can be bounded by any two of the foregoing endpoints, or can be an open-ended range. At least a portion of the cellulose is type-II cellulose. The cellulose in the adhesive admixture or wood adhesive may be either wholly or partly type-II cellulose.

The amount of type-II cellulose in the cellulose in the adhesive admixture or wood adhesive (wt. % based on solids) is at least 5 wt. %, and can be at least about 8 wt. %, e.g., at least about 10 wt. %, at least about 12 wt. %, at least about 14 wt. %, at least about 16 wt. %, at least about 18 wt. %, at least about 20 wt. %, at least about 22 wt. %, at least about 24 wt. %, at least about 26 wt. %, at least about 28 wt. %, at least about 30 wt. %, at least about 32 wt. %, at least about 34 wt. %, at least about 36 wt. %, at least about 38 wt. %, at least about 40 wt. %, at least about 42 wt. %, at least about 44 wt. %, at least about 46 wt. %, at least about 48 wt. %, at least about 50 wt. %, at least about 52 wt. %, at least about 54 wt. %, at least about 56 wt. %, at least about 58 wt. %, at least about 60 wt. %, at least about 62 wt. %, at least about 64 wt. %, at least about 66 wt. %, at least about 68 wt. %, at least about 70 wt. %, at least about 72 wt. %, at least about 74 wt. %, at least about 76 wt. %, at least about 78 wt. %, or at least about 80 wt. %, and can be as high as 100%, based on the total weight of the cellulose solids in the adhesive admixture or wood adhesive. Alternatively or in addition, the amount of type-II cellulose in the cellulose in the adhesive admixture or wood adhesive (wt. % based on solids) can be less than 100 wt. %, e.g., less than about 80 wt. %, less than about 78 wt. %, less than about 76 wt. %, less than about 74 wt. %, less than about 72 wt. %, less than about 70 wt. %, less than about 68 wt. %, less than about 66 wt. %, less than about 64 wt. %, less than about 62 wt. %, less than about 60 wt. %, less than about 58 wt. %, less than about 56 wt. %, less than about 54 wt. %, less than about 52 wt. %, less than about 50 wt. %, less than about 48 wt. %, less than about 46 wt. %, less than about 44 wt. %, less than about 42 wt. %, less than about 40 wt. %, less than about 38 wt. %, less than about 36 wt. %, less than about 34 wt. %, less than about 32 wt. %, less than about 30 wt. %, less than about 28 wt. %, less than about 26 wt. %, less than about 24 wt. %, less than about 22 wt. %, less than about 20 wt. %, less than about 18 wt. %, less than about 16 wt. %, less than about 14 wt. %, less than about 12 wt. %, less than about 10 wt. %, or less than about 8 wt. %, based on the total weight of the cellulose solids in the adhesive admixture or wood adhesive. The amount of type-II cellulose in the cellulose in the adhesive admixture or wood adhesive can be bounded by any two of the foregoing endpoints, or can be an open-ended range.

In embodiments where the cellulose is incorporated into an adhesive admixture or wood adhesive without first being separated from the residue containing lignin (resulting from processing/hydrolysis of lignocellulosic biomass), the amount of cellulose in the residue (wt. % cellulose based on the total weight of the residue on a dry basis) can be at least about 8 wt. %, e.g., at least about 10 wt. %, at least about 12 wt. %, at least about 14 wt. %, at least about 16 wt. %, at least about 18 wt. %, at least about 20 wt. %, at least about 22 wt. %, at least about 24 wt. %, at least about 26 wt. %, at least about 28 wt. %, at least about 30 wt. %, at least about 32 wt. %, at least about 34 wt. %, at least about 36 wt. %, at least about 38 wt. %, at least about 40 wt. %, at least about 42 wt. %, at least about 44 wt. %, at least about 46 wt. %, at least about 48 wt. %, at least about 50 wt. %, at least about 52 wt. %, at least about 54 wt. %, at least about 56 wt. %, at least about 58 wt. %, at least about 60 wt. %, at least about 62 wt. %, at least about 64 wt. %, at least about 66 wt. %, at least about 68 wt. %, at least about 70 wt. %, at least about 72 wt. %, at least about 74 wt. %, at least about 76 wt. %, at least about 78 wt. %, or at least about 80 wt. %, based on the total weight of the residue on a dry basis. Alternatively, or in addition, the amount of cellulose in the residue can be less than about 80 wt. %, e.g., less than about 78 wt. %, less than about 76 wt. %, less than about 74 wt. %, less than about 72 wt. %, less than about 70 wt. %, less than about 68 wt. %, less than about 66 wt. %, less than about 64 wt. %, less than about 62 wt. %, less than about 60 wt. %, less than about 58 wt. %, less than about 56 wt. %, less than about 54 wt. %, less than about 52 wt. %, less than about 50 wt. %, less than about 48 wt. %, less than about 46 wt. %, less than about 44 wt. %, less than about 42 wt. %, less than about 40 wt. %, less than about 38 wt. %, less than about 36 wt. %, less than about 34 wt. %, less than about 32 wt. %, less than about 30 wt. %, less than about 28 wt. %, less than about 26 wt. %, less than about 24 wt. %, less than about 22 wt. %, less than about 20 wt. %, less than about 18 wt. %, less than about 16 wt. %, less than about 14 wt. %, less than about 12 wt. %, less than about 10 wt. %, or less than about 8 wt. %, based on the total weight of the residue on a dry basis. The amount of cellulose in the residue can be bounded by any two of the foregoing endpoints, or can be an open-ended range. The remaining portion of the residue typically substantially comprises lignin. Thus, to a first approximation, the amount of lignin in the residue containing both lignin and cellulose can be calculated by subtracting any of the foregoing percentages from 100%. For example, if the residue contains about 30 wt. % cellulose, then the lignin will be present in an amount of about 70 wt. %. At least a portion of the cellulose is type-II cellulose.

The amount of type-II cellulose in the cellulose in the residue wt. % based on solids) ranges in quantity in the same manner as described above for the amount of type-II cellulose in the cellulose in the adhesive admixture or wood adhesive (wt. % based on solids).

In embodiments where the cellulose is incorporated into an adhesive admixture or wood adhesive without first being separated from the residue containing lignin (resulting from processing/hydrolysis of lignocellulosic biomass), the amount of residue in the adhesive admixture or wood adhesive (wt. % based on solids) can be at least about 1 wt. %, e.g., at least about 2 wt. %, at least about 4 wt. %, at least about 6 wt. %, at least about 8 wt. %, at least about 10 wt. %, at least about 12 wt. %, at least about 14 wt. %, at least about 16 wt. %, at least about 18 wt. %, at least about 20 wt. %, at least about 22 wt. %, at least about 24 wt. %, at least about 26 wt. %, at least about 28 wt. %, at least about 30 wt. %, at least about 32 wt. %, at least about 34 wt. %, at least about 36 wt. %, at least about 38 wt. %, at least about 40 wt. %, at least about 42 wt. %, at least about 44 wt. %, at least about 46 wt. %, at least about 48 wt. %, at least about 50 wt. %, at least about 52 wt. %, at least about 54 wt. %, at least about 56 wt. %, at least about 58 wt. %, at least about 60 wt. %, at least about 62 wt. %, at least about 64 wt. %, at least about 66 wt. %, at least about 68 wt. %, at least about 70 wt. %, at least about 72 wt. %, at least about 74 wt. %, at least about 76 wt. %, at least about 78 wt. %, or at least about 80 wt. %, based on the total weight of the adhesive admixture or wood adhesive on a dry basis. Alternatively, or in addition, the amount of residue in the adhesive can be less than about 80 wt. %, e.g., less than about 78 wt. %, less than about 76 wt. %, less than about 74 wt. %, less than about 72 wt. %, less than about 70 wt. %, less than about 68 wt. %, less than about 66 wt. %, less than about 64 wt. %, less than about 62 wt. %, less than about 60 wt. %, less than about 58 wt. %, less than about 56 wt. %, less than about 54 wt. %, less than about 52 wt. %, less than about 50 wt. %, less than about 48 wt. %, less than about 46 wt. %, less than about 44 wt. %, less than about 42 wt. %, less than about 40 wt. %, less than about 38 wt. %, less than about 36 wt. %, less than about 34 wt. %, less than about 32 wt. %, less than about 30 wt. %, less than about 28 wt. %, less than about 26 wt. %, less than about 24 wt. %, less than about 22 wt. %, less than about 20 wt. %, less than about 18 wt. %, less than about 16 wt. %, less than about 14 wt. %, less than about 12 wt. %, less than about 10 wt. %, less than about 8 wt. %, less than about 6 wt. %, less than about 4 wt. %, or less than about 2 wt. %, based on the total weight of the adhesive on a dry basis. The amount of residue in the adhesive can be bounded by any two of the foregoing endpoints, or can be an open-ended range. The residue typically comprises, consists of, or consists essentially of lignin and cellulose.

In some embodiments, the residue has a moisture content (wt. %) of 15, 14, 12, 10, 8, 6, 4, 2, or 1. Each of the foregoing numbers can be preceded by the word "about," "at least about," or "less than about," and any of the foregoing numbers can be used singly to describe an open-ended range or in combination to describe a close-ended range.

The adhesive admixture or wood adhesive comprises cellulose, at least a portion of which is type-II cellulose. The cellulose in the adhesive admixture or wood adhesive comprises, consists of, or consists essentially of cellulose having a type-II structure. In some embodiments, the cellulose in the adhesive admixture or wood adhesive additionally comprises cellulose having a type-I structure and/or cellulose having an amorphous structure, or any combination thereof. Relative amounts of type-I cellulose, type-II cellulose, and amorphous cellulose can be measured using solid-state 13C CP-MAS NMR spectroscopy, as described more fully in the examples herein. In some embodiments, the ratio of type-I cellulose to type-II cellulose in the cellulose product, on a dry weight basis, is about 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. In some embodiments, the cellulose in the adhesive admixture or wood adhesive is at least 99 wt. % type-II cellulose on a dry basis. Each of the foregoing numbers can be preceded by the word "about," "at least about," or "less than about," and any of the foregoing numbers can be used singly to describe an open-ended range or in combination to describe a close-ended range.

In some embodiments, the cellulose product can comprise type-I and type-II cellulose having any of the ratios herein, and the cellulose product can further comprise amorphous cellulose. The ratio of amorphous cellulose to total amount of type-I and type-II cellulose, on a dry weight basis, can be 0.5:9.5, 1:9, 1.5:9.5, 2:8, 2.5:7.5, 3:7, 3.5:6.5, 4:6, 4.5:5.5, 5:5, 5.5:4.5, 6:4, 6.5:3.5, 7:3, 7.5:2.5, 8:2, 8.5:1.5, 9:1, or 9.5:0.5. Each of the foregoing numbers can be preceded by the word "about," "at least about," or "less than about," and any of the foregoing numbers can be used singly to describe an open-ended range or in combination to describe a close-ended range.

In some embodiments, the residue is formed by a process comprising subjecting size-reduced biomass to hydrothermal treatment at a temperature of about 140° C. to about 280° C., thereby forming a solids fraction; optionally, further size-reducing the solids fraction; and treating at least a portion of the solids fraction, which optionally has been further size reduced, with hot compressed water having a temperature of about 300° C. to about 550° C., thereby forming the residue. The hydrothermal treatment can have any suitable temperature (° C.), such as 140, 160, 180, 200, 220, 240, 260, or 280. The hydrothermal treatment can employ any suitable pressure (bar), such as 5, 10, 15, 20, 25, 30, 35, 40, 45, 50, 55, 60, 65, 70, 75, 80, 85, 90, 95, or 100, The hydrothermal treatment can employ any suitable residence time (min), such as 1, 2, 3, 4, 5, 10, 15, 20, 30, 40, 50, 60, 70, 80, 90, 100, 110, or 120. The treating with hot compressed water step can employ any suitable temperature (° C.), such as 250, 260, 280, 300, 320, 340, 360, 370, 375, 380, 390, 400, 410, 420, 430, 440, or 450. The treating with hot compressed water step can employ any suitable pressure (bar), such as 50, 75, 100, 125, 150, 175, 200, 221, 225, 230, 250, 275, 300, 325, 350, 375, or 400, The treating with hot compressed water step can employ any suitable residence time (sec), such as 0.1, 0.2, 0.4, 0.6, 0.8, 1, 1.2, 1.4, 1.6, 1.8, 2, 3, 4, 5, 6, 7, 8, 9, or 10. Each of the numbers in each of the foregoing number listings can be preceded by the word "about," "at least about," or "less than about," and any of the foregoing numbers can be used singly to describe an open-ended range or in combination to describe a close-ended range, with respect to a particular parameter (e.g., temperature, pressure, and residence).

In some embodiments, plywood exhibits a bond strength of at least 90% (e.g., at least about 92%, 94%, 96%, 98%, 100%, 102%, 104%, 106%, 108%, 110%, 115%, 120%, 130%, 140%, 150%, 160%, 170%, 180%, 190%, or 200%) of the bond strength of a different plywood prepared with an otherwise identical wood adhesive that does not contain the type-II cellulose (or residue, as described herein).

In some embodiments, oriented strand board exhibits a bond strength of at least 90% (e.g., at least about 92%, 94%, 96%, 98%, 100%, 102%, 104%, 106%, 108%, 110%, 115%, 120%, 130%, 140%, 150%, 160%, 170%, 180%, 190%, or 200%) of the bond strength of a different oriented strand board prepared with an otherwise identical wood adhesive that does not contain the type-II cellulose (or residue, as described herein).

Some embodiments of the compositions and methods disclosed herein are set forth in the following clauses, and any combination of these clauses (or portions thereof) may be made to define an embodiment of the methods disclosed herein.

Clause 1: An admixture comprising:
an adhesive resin; and
cellulose;
wherein at least a portion of the cellulose is type-II cellulose.

Clause 2: The admixture of clause 1, further comprising lignin.

Clause 3: The admixture clause 1, wherein the cellulose is present in the admixture in an amount of about 5 wt. % to about 50 wt. %, on a dry basis.

Clause 4: The admixture of clause 2, wherein the total combined weight of the lignin and the cellulose, based on the total combined weight of the lignin, the cellulose, and the adhesive resin, on a dry basis, is about 10 wt. % to about 80 wt. %.

Clause 5: The admixture of clause 2, wherein the cellulose is present in an amount of about 20 wt. % to about 80 wt. %, based on the total combined weight of the lignin and the cellulose, on a dry basis.

Clause 6: The admixture of clause 1, wherein the adhesive resin is an amino resin, a phenol-formaldehyde resin or a poly(diphenylmethane diisocyanate) resin.

Clause 7: The admixture of clause 2, wherein the admixture is formed by providing the lignin and the cellulose in the form of a residue and mixing the adhesive resin with the residue.

Clause 8: The admixture of clause 7, wherein the residue has a moisture content of less than about 15 wt. % prior to the mixing.

Clause 9: The admixture of clause 2, wherein the admixture is formed by providing the lignin and the cellulose in the form of a residue and mixing the adhesive resin with the residue, wherein the residue is obtained by supercritical hydrolysis of biomass.

Clause 10: The admixture of clause 2, wherein the admixture is formed by providing the lignin and the cellulose in the form of a residue and mixing the adhesive resin with the residue wherein the residue is obtained by a process comprising:
subjecting size-reduced biomass to hydrothermal treatment at a temperature of about 140° C. to about 280° C., thereby forming a solids fraction;
optionally, further size-reducing the solids fraction; and
treating at least a portion of the solids fraction, which optionally has been further size reduced, with hot compressed water having a temperature of about 300° C. to about 550° C., thereby forming the residue.

Clause 11: The admixture of clause 11, wherein at least a portion of the cellulose is type-I cellulose.

Clause 12: The admixture of clause 1, further comprising a base.

Clause 13: The admixture of clause 12, wherein the base is soda ash or a metal hydroxide, such as sodium hydroxide.

Clause 14: The admixture of clause 1, further comprising urea, biuret, a derivative thereof, or any combination thereof.

Clause 15: The admixture of clause 1, wherein the adhesive resin is a phenol-formaldehyde resin.

Clause 16: The admixture of clause 15, wherein the phenol-formaldehyde resin is a resol resin.

Clause 17: The admixture of clause 16, wherein the phenol-formaldehyde resin is a novolac resin.

Clause 18: The admixture of clause 1, further comprising an extender.

Clause 19: The admixture of clause 1, wherein the admixture is a wood adhesive.

Clause 20: Cured wood adhesive of clause 19.

Clause 21: Plywood comprising the cured wood adhesive of clause 20.

Clause 22: The plywood of clause 21, wherein the plywood exhibits a bond strength of at least 90% of the bond strength of a different plywood prepared with an otherwise identical wood adhesive that does not contain the type-II cellulose.

Clause 23: An oriented strand board comprising the cured wood adhesive of clause 20.

Clause 24: The oriented strand board of clause 23, wherein the oriented strand board exhibits a bond strength of at least 90% of the bond strength of a different oriented strand board prepared with an otherwise identical wood adhesive that does not contain the type-II cellulose.

Clause 25: A composition comprising an adhesive resin, wherein the adhesive resin comprises a condensation product of:
formaldehyde; and
at least one phenolic compound;
wherein the condensation product is formed in the presence of cellulose;
wherein at least a portion of the cellulose is type-II cellulose.

Clause 26: The composition of clause 25, wherein at least a portion of the cellulose is type-I cellulose.

Clause 27: The composition of clause 25, wherein the at least one phenolic compound comprises lignin.

Clause 28: The composition of clause 25, wherein the at least one phenolic compound comprises phenol.

Clause 29: The composition of clause 25, wherein the at least one phenolic compound comprises phenol and lignin.

Clause 30: The composition of clause 25, wherein the lignin is pre-reacted with phenol prior to the condensation reaction with formaldehyde.

Clause 31: The composition of clause 25, wherein the cellulose is present in an amount of about 5 wt. % to about 50 wt. %, based on the total combined weight of the formaldehyde, the at least one phenolic compound, and the total cellulose, wherein amounts are on a dry basis, and wherein the total cellulose includes type I cellulose, type II cellulose, and amorphous cellulose.

Clause 32: The composition of clause 27, wherein the total combined weight of the lignin and the cellulose is about 10 wt. % to about 80 wt. %, based on the total combined weight of the formaldehyde, the lignin, and the total cellulose, wherein amounts are on a dry basis, and wherein the total cellulose includes type I cellulose, type II cellulose, and amorphous cellulose.

Clause 33: The composition of clause 27, wherein the cellulose is present in an amount of about 20 wt. % to about 80 wt. %, based on the total combined weight of the lignin and the total cellulose, wherein amounts are on a dry basis, and wherein the total cellulose includes type I cellulose, type II cellulose, and amorphous cellulose.

Clause 34: The composition of clause 27, wherein a residue comprising the lignin and the cellulose is present during the formation of the condensation product, and wherein the residue is obtained from supercritical hydrolysis of biomass.

Clause 35: The composition of clause 34, wherein the residue has a moisture content of less than about 15 wt. %.

Clause 36: The composition of clause 27, wherein a residue comprising the lignin and the cellulose is present during the formation of the condensation product, and wherein the residue is obtained from a process comprising:
subjecting size-reduced biomass to hydrothermal treatment at a temperature of about 140° C. to about 280° C., thereby forming a solids fraction;
optionally, further size-reducing the solids fraction; and
treating at least a portion of the solids fraction which optionally has been further size reduced with hot compressed water having a temperature of about 300° C. to about 550° C., thereby forming the residue.

Clause 37: The composition of clause 25, wherein the condensation product is formed in the presence of base.

Clause 38: The composition of clause 25, further comprising urea, biuret, a derivative thereof, or any combination thereof.

Clause 39: The composition of clause 25, further comprising an extender.

Clause 40: The composition of clause 25, wherein the composition is a wood adhesive.

Clause 41: Cured wood adhesive of clause 40.

Clause 42: Plywood comprising the cured wood adhesive of clause 41.

Clause 43: The plywood of clause 42, wherein the plywood exhibits a bond strength of at least 90% of the bond strength of a different plywood prepared with an otherwise identical wood adhesive that does not contain the type-II cellulose.

Clause 44: An oriented strand board comprising the cured wood adhesive of clause 41.

Clause 45: The oriented strand board of clause 44, wherein the oriented strand board exhibits a bond strength of at least 90% of the bond strength of a different oriented strand board prepared with an otherwise identical wood adhesive that does not contain the type-II cellulose.

It is to be understood that the invention also provides embodiments that result from the combination of any of the embodiments disclosed herein or described in the Examples, unless such combination is mutually exclusive.

The invention is further illustrated by the following examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

The present invention is further defined in the following Examples, in which all parts and percentages are by weight, unless otherwise stated. It should be understood that these examples, while indicating preferred embodiments of the invention, are given by way of illustration only and are not to be construed as limiting in any manner. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

This example demonstrates the production and testing of various materials containing type-II cellulose and/or lignin for use with adhesive resins in the manufacture of engineered wood products (e.g., plywood and oriented strand board), The following lignin samples, lignin-containin samples, and type-II cellulose containing samples, and combinations thereof, have been tested:

SH residues (SHR) with various compositions and from different feedstock (hardwood and softwood)
  Air-dried: SHR-50, SHR-70, SHR-80, (where "-XX" designates the approximate weight percent lignin content based on solids, see Table 1)
  Alkaline slurry of SHR-80 at 30% solids and NaOH added in an amount of 10% of SHR solids (solids on solids): SHR-80-Alk
Lignins of high purity extracted from SHR-50:
  Dried:
    NaOH-extracted: SHL-50
    40% ethanol extracted: SHL50-E40
  Alkaline solution of SHL-50 (lignin was not precipitated from the alkaline solution, the solution was concentrated to solid content of 25%; the amount of NaOH was 20% of the total solids): SHL-Alk
Cellulose remaining after extraction of lignin from SHR-50
  The cellulose remaining after extraction of lignin from SHR-50 using NaOH was collected (SHR-50–AR). This residue still contains lignin (see Table 1), but the majority of the sample is cellulose.
Lignin precipitated during acid hydrolysis (AH) of xylan oligomers (XOS) after hemicellulose hydrolysis process): XAHL HHR And SHR-XX Preparation HHR: Sub-Critical Hydrolysis Residue of Hardwood Biomass.

Size-reduced biomass comprising hardwood having an average particle size of less than about 500 μm was mixed with water to form a slurry. The slurry was reacted at a temperature of about 170-245° C. and a pressure of about 35-62 bar for a period of about 1-120 minutes (termed "the HH process"). The reaction mixture was cooled to less than 100° C. and depressurized to less than 10 bar. The cooled and depressurized reaction mixture was then filtered using a filter press. The liquids correspond to the xylo-oligosaccharide (XOS) stream. The solids correspond to the HHR sample. The solids were collected and re-slurried with water.

SHR-XX: Supercritical Hydrolysis Residue of Hardwood Biomass; Residue Containing Approximately XX % Lignin, Based on Solids.

The slurry from above was pumped at a rate of about 160 kg/h to about 200 kg/h at ambient conditions, while sub-critical, near-critical, or supercritical water having a temperature of about 360° C. to about 600° C. and a pressure of about 200 bar to about 600 bar was contacted with the slurry at a rate of about 485 kg/h to about 505 kg/h (termed "the SH process"), and the resulting reaction mixture maintained at reaction conditions for about 0.1 sec to about 10 sec. The resulting reaction mixture was cooled to ambient conditions, and the mixture subjected to a filter press to obtain SH solids (SHR) and a liquid gluco-oligosaccharide (GOS) stream. Three different SHR solids were prepared with lignin content of about 50, 70 and 80% and thus called SHR-50, SHR-70 and SHR-80, respectively. In general, SHR solids having different lignin contents can be prepared by varying the reaction conditions: generally higher temperature and/or longer residence time lead to higher lignin content (since more cellulose is hydrolyzed and removed in the liquid GOS stream), and generally lower temperature and/or shorter residence times lead to lower lignin content (since more cellulose remains unhydrolyzed and remains with the solids).

SHR-60-SW Preparation

The SHR-60-SW sample was prepared from softwood (loblolly pine, *Pinus taeda*) under the same reaction conditions described above for the SHR hardwood samples.

XAHL Preparation

The solution of xylan oligomers (XOS) obtained after HH processing of hardwood feedstock underwent acid hydrolysis (AH) under the following conditions: 95-150° C., 0.1-6% sulfuric acid, 10-500 g/L oligomer, 5 min to 5 hours. After AH, the precipitated material (lignin) was collected by filtration, re-slurried in water to form a fine suspension, filtered, exhaustively washed with water on the filter, and dried to produce XAHL preparation.

SHR-80-Alk Preparation

50% (w/w) NaOH solution was added to wet SHR-80 residue with moisture content of 40% under vigorous stirring at room temperature. The amount of NaOH was 10 g per 100 g (on thy solids basis) SHR-80. Water was added then to adjust the moisture content of the slurry to 70%.

SHL-50, SHL-70, and SHL-80 Preparation

Aqueous sodium hydroxide solution (1% NaOH by weight) was used to produce sample SHL-50 from SHR-50, sample SHL-70 from SHR-70, and SHL-80 from SHR-80. Lignins were extracted from SHRs at room temperature under mixing during 3 hours at liquid:solid (L:S) ratio of 10:1 (w/w). The alkaline lignin solution was then separated from the undissolved solids by centrifugation. These undissolved solids correspond to SHR-50–AR described below. Lignin was precipitated from the combined NaOH solution by adjusting pH to 2.0, filtered, washed with water to neutral reaction and dried, to form the SHL-XX samples.

SHR-50–AR Preparation

The solids remaining after NaOH extraction of SHR samples to produce SHL-XX (as described above) were collected. These solids still contain lignin (see Table 1), but the majority of the sample is cellulose.

SHL-50-Alk Preparation

As described above, lignins (such as SHL-50) were extracted from SHRs (such as SHR-50) by addition of aqueous sodium hydroxide solution (1% NaOH by weight) at room temperature and mixing for 3 hours at L:S ratio of 10:1 (w/w). The alkaline lignin solution was then separated from the undissolved solids by centrifugation. While one portion of the alkaline solution was acidified to precipitate a solid lignin sample (such as SHL-50—see above), a second portion of the solution was instead concentrated by water evaporation in a rotary evaporator at 45° C. under vacuum to achieve a solids content of 25%. The latter sample is the SHL-50-Alk, SHL50-E40 Preparation Samples of SHL50-E40 were prepared by extraction of the SHR-50 with 40% (w/w) EtOH (L:S=10). The solution was separated by centrifugation and the undissolved solids were extracted in the same manner 2 more times. The combined solution was evaporated to dryness in a rotary evaporator at 40° C. and the solids (lignin) in the rotary evaporator were collected.

Preparation of PF Admixtures

Phenol-formaldehyde (PF) admixtures with lignin/cellulose (e.g., lignin/cellulose residue from supercritical hydrolysis of biomass) were prepared by blending lignin/cellulose, NaOH, and PF resin. Target solids contents of the blends were 50-58 wt. % for oriented strand board (OSB) PF-lignin/cellulose blends, and 38-42 wt. % for plywood PF-lignin/cellulose blends. Water was added if needed to achieve these solids content ranges, Unless otherwise stated in the examples, all of the adhesive preparations are admixtures of the PF resin and cellulose and/or lignin, as defined elsewhere herein.

Compositional Analysis of the Samples

The compositional analysis was performed according to the standard NREL, protocol for biomass analysis (NREL/TP-510-42618, herein incorporated by reference in its entirety), The results are shown in Table 1. The sugars listed in the headings of Table 1 are xylan, glucan, arabinan, galactan, rhamnan, and mannan. The glucan content corresponds to the cellulose present in the sample.

NMR Analysis of Extracted Lignins

The NMR spectra were recorded on a Bruker AVANCE 500 MHz spectrometer at 300 K using DMSO-$d_6$ as the solvent. Chemical shifts were referenced to TMS (0.0 ppm). For the quantitative 13C-NMR, the concentration of lignin was 35% weight on volume; a 90° pulse width, a 1.4 second acquisition time and 1.7 second relaxation delay were used. Chromium (III) acetylacetonate (0.016 M) was added to the lignin solution to provide complete relaxation of all nuclei. A total of 20,000 scans were collected. The spectra were processed and the data are calculated according to previously published procedure (Capanema, E. A., Balakshin, M. Yu, Chang, H-m., Jameel, H. (2005) *Isolation and characterization of residual lignins from hardwood pulps: Method improvements*. Proc. 13th Intern. Symp. Wood Fibre Pulping C, Auckland, New Zealand, v.III, 57-64, incorporated herein by reference in its entirety). The CO, COOR, OH, ArH, "β," OCH3, and aliphatic contents are measured by quantitative $^{13}C$ NMR and are in the units "per 100 aromatic rings." These features are measured using the NMR methods set forth in U.S. Patent Application Publication 2014/0275501, hereby incorporated by reference in its entirety. The syringyl:guaiacyl ratio (S/G) and Degree of Condensation (DC) were also recorded. The results are reported in Table 2.

TABLE 1

Compositional analysis of samples

| Sample | % Ash | % Xyl | % Glu | % Ara | % Gal | % Rha | % Man | Total sugar % | Total Lignin | Total |
|---|---|---|---|---|---|---|---|---|---|---|
| XAHL | 0.01 | 1.1 | 0.2 | 0.04 | 0.08 | 0.06 | 0.19 | 1.7 | 91.1 | 92.8 |
| SHR-50 | 0.10 | 1.3 | 42.2 | 0.23 | 0.04 | 0.34 | 0.21 | 44.2 | 56.6 | 100.8 |
| SHR-70 | 0.21 | 0.5 | 29.4 | 0.04 | 0.05 | 0.05 | 0.13 | 30.2 | 68.1 | 98.3 |
| SHR-80 | 0.38 | 0.4 | 18.8 | 0.03 | 0.03 | ND | 0.16 | 19.5 | 77.1 | 96.5 |
| SHR-60-SW | 0.10 | 0.8 | 30.2 | 0.02 | 0.21 | ND | 1.05 | 32.2 | 63.8 | 96.1 |
| SHL-50 | 0.26 | 0.2 | 0.65 | 0.02 | 0.03 | 0.02 | 0.06 | 0.98 | 98.0 | 99.2 |
| SHL-70 | 0.60 | 0.22 | 0.48 | 0 | 0.08 | 0.08 | 0.07 | 1.53 | 95.7 | 97.2 |
| SHL-80 | 0.40 | 0.33 | 0.38 | 0 | 0 | 0 | 0 | 1.11 | 93.6 | 94.7 |
| SHL-60-SW | 1.5 | 0.20 | 1.17 | 0.06 | 0.07 | 0.07 | 0.47 | 3.47 | 91.1 | 94.6 |
| SHR-50-AR | ND | 0.74 | 76.4 | 0.04 | 0.04 | 0.04 | 0.63 | 77.9 | 16.5 | 94.3 |
| SHR-80-AR | 0.12 | 1.4 | 73.8 | 0.20 | 0.10 | 0.70 | 0.10 | 73.8 | 24.7 | 98.5 |

ND: not determined

TABLE 2

Structural characteristics of lignin samples

| Characteristics | SHL-50 | SHL-70 | SHL-80 | SHL50-E40 | XAHL | SHL-SW |
|---|---|---|---|---|---|---|
| $T_g$, °C | 102 | NR | NR | 61.5 | NR | NR |
| Total CO | 15 | 15 | 12 | 22 | 64 | 16 |
| Non-conjugated CO | 5 | 6 | 5 | 9 | 32 | 6 |
| Conjugated CO | 10 | 9 | 7 | 13 | 32 | 10 |
| Total COOR | 12 | 14 | 15 | 11 | 24 | 17 |
| Aliphatic COOR | 9 | 10 | 11 | 9 | 20 | 16 |
| Conjugated COOR | 3 | 4 | 4 | 2 | 4 | 1 |
| Total OH | 112 | 116 | 107 | 126 | 128 | 96 |
| Aliphatic | 50 | 48 | 44 | 50 | 36 | 50 |
| Primary | 29 | 27 | 25 | 28 | 17 | 33 |
| Secondary | 21 | 21 | 19 | 22 | 19 | 17 |
| Phenolic | 62 | 68 | 63 | 76 | 92 | 46 |
| S/G | 1.19 | 1.17 | 1.13 | 1.55 | 0.57 | NA |
| ArH | 213 | 207 | 204 | 206 | 201 | 228 |
| Degree of condensation (DC) | 33 | 39 | 43 | 33 | 62 | 72 |
| β-O-4 | 15 | 14 | 10 | 14 | trace | 13 |
| β-β | 5 | 4 | 4 | 4 | trace | 6 |
| β-5 | 3 | 2 | 2 | 4 | trace | 7 |

TABLE 2-continued

Structural characteristics of lignin samples

| Characteristics | SHL-50 | SHL-70 | SHL-80 | SHL50-E40 | XAHL | SHL-SW |
|---|---|---|---|---|---|---|
| $OCH_3$ | 122 | 119 | 118 | 123 | 73 | 81 |
| Oxygenated aliphatic | 108 | 91 | 87 | 101 | 80 | 107 |
| Saturated aliphatic | 49 | 54 | 62 | 52 | 103 | 168 |
| Sugars (approximate) | 1 | 1 | 1 | 1 | 1 | 2 |
| $M_n$, Da | 1077 | 1123 | 1187 | 672 | 1240 | 1526 |
| $M_w$, Da | 4386 | 4003 | 4255 | 1337 | 3350 | 4865 |
| PDI | 4.07 | 3.56 | 3.58 | 1.99 | 2.70 | 3.19 |

NR: Not reported

Cellulose Supramolecular Structure by $^{13}C$ CP-MAS NMR

Solid State $^{13}C$ CP-MAS NMR spectroscopy was used to determine the relative amounts of, type-I cellulose, type-II cellulose, and amorphous cellulose in the following lignin/cellulose residues (described above): HHR, SHR-50, and SHR-80.

Solid State $^{13}C$ CP-MAS NMR spectroscopy is a well-established method to determine the supramolecular structure and crystallinity of cellulose, as discussed, for example, by Zuckerstatter, G. et al., in "*The Elucidation of Cellulose Supramolecular Structure by $^{13}$ C CP-MAS NMR*", Lenzinger Berichte, 87, (2009), 38-46, incorporated herein by reference in its entirety. Generally, the obtained spectrum of cellulose exhibits easily separable resonances from crystalline and less-ordered domains for the C4 and C6 atoms in the anhydroglucose unit (AGU). The cellulose C4 signal is particularly well resolved and stretches over a wide chemical shift range from about 79 ppm to 91 ppm. Prior work in the art has established that the signals at about 89 ppm and 84 ppm can be attributed to crystalline and non-crystalline (amorphous) components, respectively, the relative components of which may be determined either by integration of peak areas using fixed integration limits, or by signal deconvolution. Herein, the spectra are analyzed by the method of deconvolution as described in the reference cited above. In differentiating between, and quantifying relative amounts of, type-I cellulose, type-II cellulose, and amorphous cellulose, it has been found advantageous to analyze the C6 line shapes, the resonances for which are well-separated.

The following residues, prepared as described above (Example 1), were further studied by $^{13}C$ CP-MAS NMR spectroscopy to ascertain structural information, crystallinity and cellulose type for the cellulose component of the residues: MIR, SHR-50, SHR-80. For each residue, samples were prepared for NMR study as follows: the samples were exhaustively washed with water to remove residual water soluble matter and exhaustively extracted with 80% (volume/volume) aqueous dioxane at room temperature to eliminate the maximum amount of lignin from them. Usually, for SHR residues, about 85-90% of lignin originally present in the sample was removed by this procedure; and for HHR residues, about 50% of lignin originally present in the sample was removed by this procedure.

Solid state NMR spectra were obtained for these washed and extracted preparations. The $^{13}C$ CP-MAS NMR spectrometer preparation and operating conditions are described in the cited reference (page 39, second column). To eliminate residual lignin signals from the spectra, the spectrum of the corresponding pure extracted lignin (SHL) was acquired and subtracted from these spectra. The signal due to –OMe groups at about 56 ppm was used for normalizing the spectra before the subtraction. The pure extracted lignin for each of the HHR, SHR-50, and SHR-80 samples was obtained by subjecting separate fresh samples to extraction at room temperature under mixing during 3 hours at liquid:solid (L:S) ratio of 10:1 (w/w) using 1 wt. % aqueous sodium hydroxide solution. The alkaline lignin solution was then separated from any undissolved solids by centrifugation, and the solubilized lignin was precipitated by adjusting the pH to 2.0, followed by filtering and washing with water, with subsequent drying. These pure lignin samples for each of the HHR, SHR-50, and SHR-80 samples were used in the spectrum subtraction.

Figure 2:
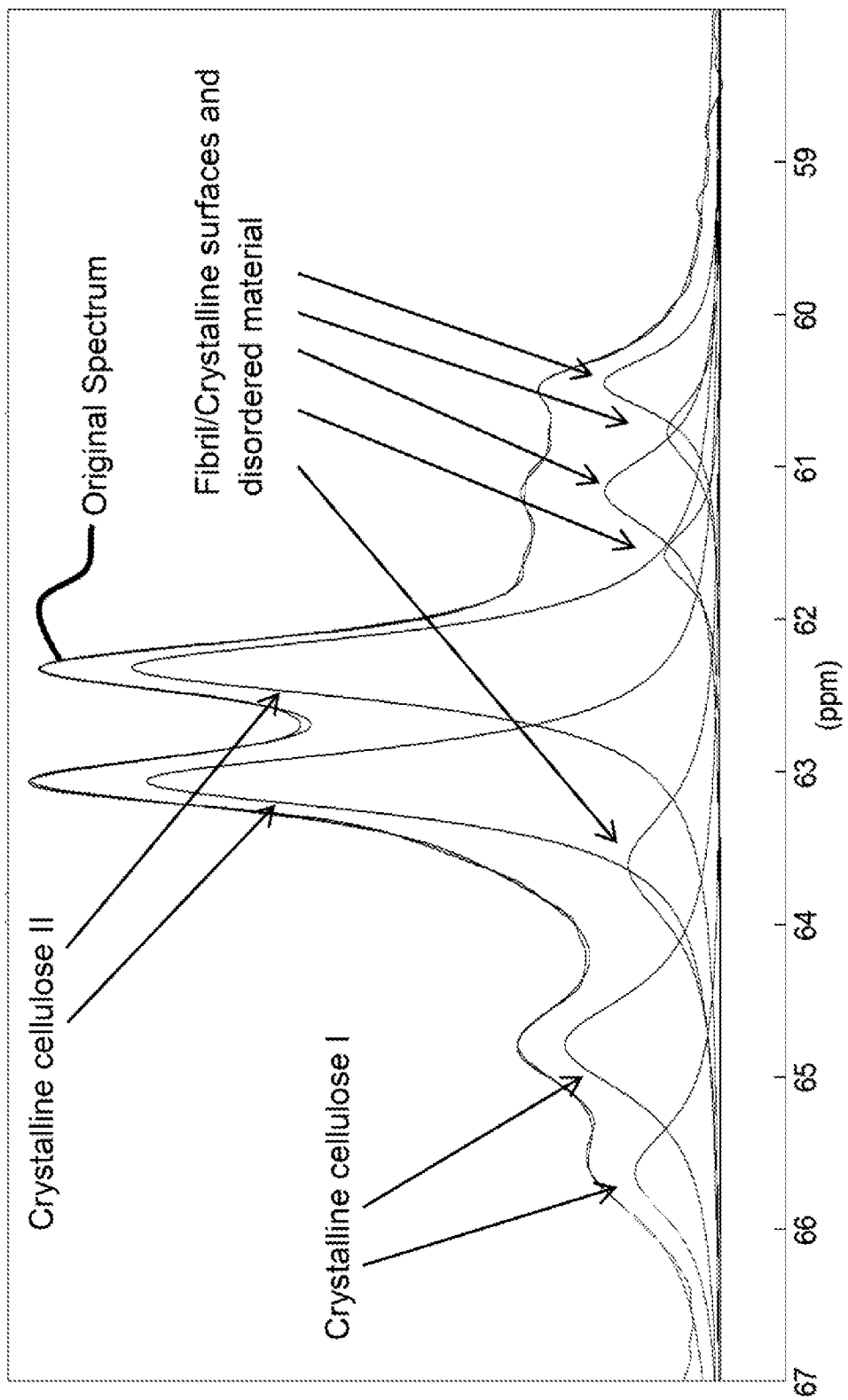
FIG. 2 shows the deconvoluted and fitted curve in the C6 region of the $^{13}C$ CP-MAS NMR spectrum for SHR-50 (see Example 1).

Because the C4 region for HHR shows only type-i cellulose, the analysis is more readily performed on this C4 chemical shift range (from about 79 ppm to 91 ppm); in the case of SHR-50 and SHR-80, the C4 region shows significant amounts or predominantly type-II cellulose for which the C6 region (chemical shift range from about 58 ppm to 67 ppm) is more readily analyzed. FIG. 1 shows the spectrum for SHR-50. The deconvoluted and fitted curve in the C6 region for SHR-50 is shown in FIG. 2. The spectra for HHR and SHR-80 are not shown, but the deconvolution and curve fitting was done in the same manner. The $^{13}C$ CP-MAS NMR analysis of HHR, SHR-50, and SHR-80 is presented in Tables 3, 4 and 5, respectively.

TABLE 3

$^{13}C$ CP-MAS NMR analysis of sample HHR.

| | δ (ppm) | Width (ppm) | Normalized Integral |
|---|---|---|---|
| $I_α$ | 89.41 | 0.44 | 0.87 |
| $I_{α+β}$ | 88.75 | 0.66 | 21.08 |
| $I_β$ | 87.92 | 1.17 | 27.13 |
| paracrystalline | 88.30 | 1.75 | 7.31 |
| accessible fibril surface | 84.34 | 1.15 | 10.42 |
| accessible fibril surface | 83.25 | 0.95 | 8.10 |
| inaccessible fibril surface | 83.92 | 2.35 | 14.00 |
| amorphous cellulose | 82.06 | 1.85 | 11.08 |

TABLE 4

$^{13}C$ CP-MAS NMR analysis of SHR-50

| | δ (ppm) | Width (ppm) | Integral (%) |
|---|---|---|---|
| crystalline I | 65.63 | 0.77 | 5.93 |
| crystalline I | 64.79 | 0.81 | 11.66 |
| crystalline II | 63.06 | 0.51 | 28.24 |
| crystalline II | 62.32 | 0.51 | 29.14 |
| fibril/crystallite/disordered | 63.61 | 0.90 | 7.76 |

TABLE 4-continued

¹³C CP-MAS NMR analysis of SHR-50

| | δ (ppm) | Width (ppm) | Integral (%) |
|---|---|---|---|
| fibril/crystallite/disordered | 61.58 | 0.46 | 2.50 |
| fibril/crystallite/disordered | 61.16 | 0.64 | 7.01 |
| fibril/crystallite/disordered | 60.77 | 0.51 | 2.63 |
| fibril/crystallite/disordered | 60.45 | 0.46 | 5.13 |

TABLE 5

¹³C CP-MAS NMR analysis of SHR-80

| | δ (ppm) | Width (ppm) | Integral (%) |
|---|---|---|---|
| crystalline II | 63.04 | 0.46 | 40.63 |
| crystalline II | 62.29 | 0.49 | 44.39 |
| fibril/crystallite/disordered | 62.68 | 0.69 | 2.25 |
| fibril/crystallite/disordered | 61.60 | 0.18 | 0.60 |
| fibril/crystallite/disordered | 61.10 | 0.55 | 5.63 |
| fibril/crystallite/disordered | 60.44 | 0.60 | 6.51 |

Using the curve fitting results, the relative ratios of type-I cellulose, type-II cellulose, and amorphous cellulose were determined as follows. For the HHR sample, ratio of type-I cellulose to amorphous cellulose was about 1:0.77. There was no type-II cellulose in the HHR sample. For the SHR-50 sample, the ratio of type-I cellulose to type-II cellulose to amorphous cellulose was about 1:3.3:1.4. In other words, for the SHR-50 sample, the ratio of amorphous cellulose to total amount of type-I and type-II cellulose is about 1:3 (1.4/(1+3.3)). For the SHR-80 sample, the ratio of type-II cellulose to amorphous cellulose was about 1:0.2. There was no type-I cellulose in the SHR-80 sample.

Type-II cellulose is not found in naturally occurring biomass. The HHR residue (step 1 residue) resulting from mild hydrolysis conditions of the biomass feedstock that enters the process also does not contain type-II cellulose. However, the analysis of the ¹³C CP-MAS NMR spectra shows that the cellulose present in the SHR-50 and SHR-80 residues resulting from the supercritical water hydrolysis of the step 1 solid residue is largely (57.4% for SHR-50) or almost entirely (85.0% for SHR-80) type-II cellulose (the remainder of the cellulose being amorphous).

Crystallinity by X-Ray Diffraction, XRD

Figure 3:
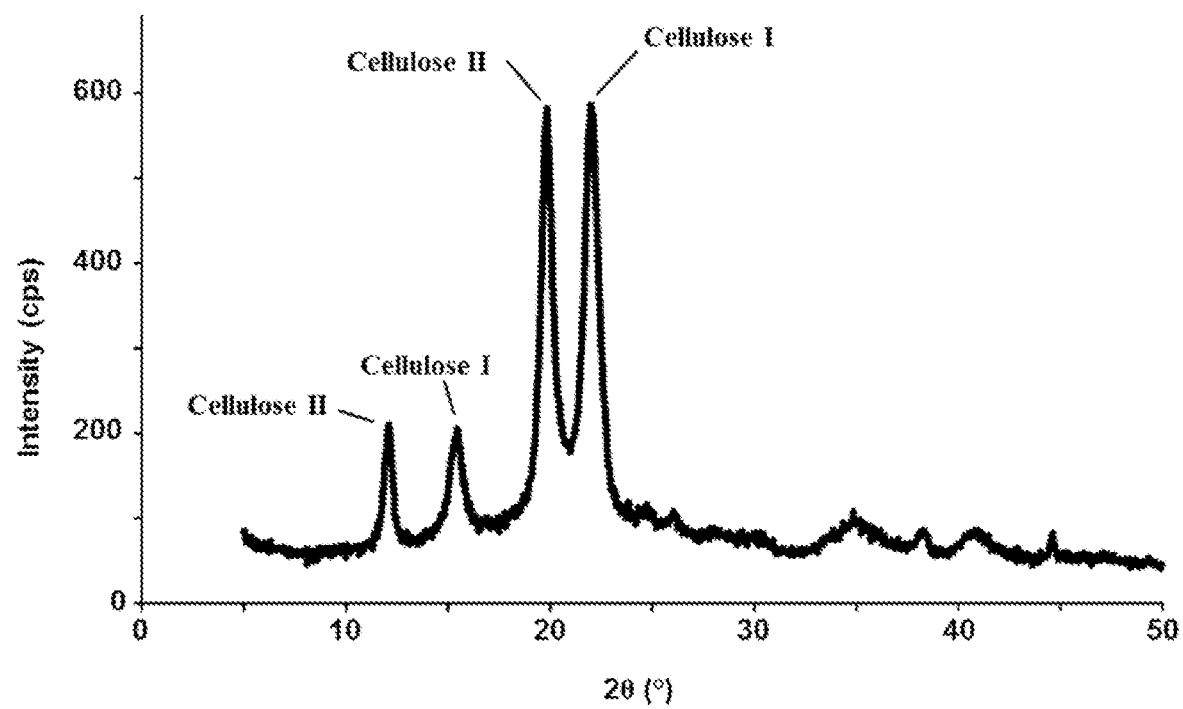
FIG. 3 shows the X-ray diffraction (XRD) spectrum of the cellulose in the SHR-50 residue (after removal of lignin by alkaline extraction, see Example 1).

Separately, one of the solid residues from the supercritical water hydrolysis step (SHR-50, after removal of lignin by alkaline extraction) was purified by 4 different routes, yielding purified white solids (PWS-1, 2, 3 and 4) and the samples were further analyzed by x-ray diffraction ("XRD") using a Rigaku SmartLab X-Ray diffractometer equipped with a monochrometer using a Cu Kα radiation step size of 0.05°(2θ) and a count time of 5 sec at each step. The results are shown in FIG. 3.

It was found, based on the presence of the peaks at 15.5° and 22.5 (for cellulose I) and those at 20 and 12.1 (for cellulose II) in the XRD of all samples analyzed, that under the employed supercritical conditions the type I cellulose was partially converted to type II cellulose. The estimated degree of crystallinity for all samples is shown in Table 6, calculated using the XRD peak height method, a technique well known in the art (see, e.g., Segal L., Creely J. J., Martin A. E. Jr, Conrad C. M.: An empirical method for estimating the degree of crystallinity of native cellulose using the x-ray diffractometer. Tex Res J 1962, 29:786-794, hereby incorporated by reference in its entirety).

TABLE 6

Estimated degree of crystallinity in %.

| PWS 1 | PWS 2 | PWS 3 | PWS 4 |
|---|---|---|---|
| 83 | 88 | 80 | 83 |

X-Ray diffraction can be used to estimate the overall degree of crystallinity, and can be used to identify the presence (and type) of different crystalline species, but it cannot be used to ascertain the relative amounts of each crystalline species. Nonetheless, the x-ray diffraction results are consistent with the findings from the solid state ¹³C CP-MAS NMR study.

Carbonyl Content in Purified Cellulose Samples

Carbonyl content (CO) and molecular weights for cellulose products were determined using a combination of fluorescence labeling and GPC. The HHR, SHR-50, and SHR-80 samples (discussed above), prior to any extraction or washing, were used in this example.

Each of these samples was exhaustively washed with water to remove residual water soluble matter and exhaustively extracted with 80% (volume/volume) aqueous dioxane at room temperature. The solids remaining after extraction were subjected to a sodium chlorite extraction as follows: 1 g of solids was mixed with 200 mL of 0.2 M sodium chlorite solution in 0.2 M sodium acetate buffer solution (pH of 5). The resulting mixture was agitated by shaking for 48 hours. After 48 hours, the solids were filtered and then washed with water and ethanol. This chlorite extraction was repeated once to remove impurities and obtain pure cellulose. The obtained cellulose (designated in the table below by "-x") was measured for CO content and molecular weight according to Röhrling et al, "A Novel Method for the Determination of Carbonyl Groups in Cellulosics by Fluorescence Labeling. 2. Validation and Applications," (*Biomacromolecules* (2002) 3, 969-975), hereby incorporated by reference in its entirety. Briefly, a solution of the fluorescence label ([2-(2-aminooxyethoxy)ethoxy] amide "CCOA") is prepared by dissolving CCOA in 50 mL of 20 mM zinc acetate buffer, pH 4. About 20-25 mg of dry cellulose sample is then suspended in 4 mL of the acetate buffer containing the label. The suspension was then agitated at 40° C. for 168 h. The suspension was then filtered, and the solids activated by performing a solvent exchange from water to DMAc, followed by filtration. The activated solids were then dissolved in 2 mL of DMAc/LiCl (9%, w/v) at room temperature. The solutions were then diluted to 0.9% (w/v), filtered through a 0.45 μm filter, and then analyzed by GPC. The GPC system employed fluorescence, MALLS, and refractive index (RI) detectors with four serial columns. A dn/dc of 0.140 mL/g was used. The eluent was DMAc/LiCl (0.9%, w/v), flow of 1.00 mL/min, four columns in series (PL gel mixedA ALS, 20 μm, 7.5×300 mm), fluorescence detection (290 nm excitation, 340 nm emission), injection volume 100 μL, and run time 45 min. The results are shown in Table 7.

TABLE 7

Carbonyl Content and Molecular Weights of Various Pure Cellulose Samples

|  | $M_w$ (kg/mol) | $M_n$ (kg/mol) | $M_z$ (kg/mol) | PDI (kg/mol) | CO (µmol/g) |
|---|---|---|---|---|---|
| HHR-x | 368.2 | 86.3 | 1129 | 4.3 | 50.7 |
| SHR-50-x | 28.7 | 20.2 | 43.8 | 1.4 | 97.3 |
| SHR-80-x | 96.5 | 51.5 | 253.7 | 1.9 | 219.1 |

Bondability Tests Using the Automatic Bond Evaluation System (ABES)

Two commercial liquid PF resins (resol type) were sourced and used in combination with different materials of the invention at various PF/lignin ratios for the ABES tests. The ABES system is commercially available, including testing equipment from Adhesive Evaluation Systems, Inc. The first commercial resin was a more condensed PF resin with a solids content of 44% (including about 8.5% NaOH) and a viscosity of about 750 mPa·s (750 cps) at 25° C., suitable for softwood plywood manufacture. The other commercial resin was a less condensed PF resin with a solids content of 57% and a viscosity of about 150 mPa·s (150 cps) at 25° C., suitable as a face layer adhesive for OSB manufacture.

To prepare a sample for the ABES tests, the moisture content of a test sample (cellulose and/or lignin) was first determined by the oven-drying method. For test samples in the solid form, the sample was ground into a fine powder and then mixed manually and thoroughly with a commercial liquid PF resin at a calculated dry weight ratio. For test samples in the form of a mud, a thin slurry, or a solution, the sample was directly mixed manually and thoroughly with a commercial liquid PF resin at a predetermined dry weight ratio. Dried SHR samples were used for further experiments. PF resins were prepared, substituting 30 wt. % (FIG. 4) of the plywood PF resin, and 30% (FIG. 5) of the OSB PF resin, with the indicated material.

Sliced maple veneers 117 mm×20 mm×0.8 mm (conditioned at 50% RH & 20° C.) were used for the test. The glue was applied in a way to form a bonding area of 20 mm×5 mm, which adheres to the faces of two substrates, one on the other.

Almost immediately after each bond was cured to the required level, it was tested to destruction in shear mode. The shear test pulls the two substrates in opposite directions in the plane of the adhesive glue layer and should have a cohesive failure mode (i.e. it should fail through the adhesive bulk and not at the adhesive-substrate interface). For this test, the tensile load was monitored digitally during bond pulling, and the shear-stress-to-failure (area corrected peak load) was calculated. Five replicates were performed for each resin sample. For this bondability test, the press temperature was 150° C. at 2 MPa, the press time was 90 seconds, and the test reflects the maximal strength of an adhesive at complete cure.

In order to assess the strength and integrity of adhesion between wood and adhesive, the percent wood failure is determined after a plywood specimen has been subjected to shear test destructively. High percent wood failure corresponds to low adhesive failure, indicating that the adhesive bond is stronger than the wood substrate. Therefore, high percent wood failure is usually interpreted as satisfactory adhesion. The higher the wood failure percentage, the better the quality of adhesive bonding in the plywood.

Figure 4:
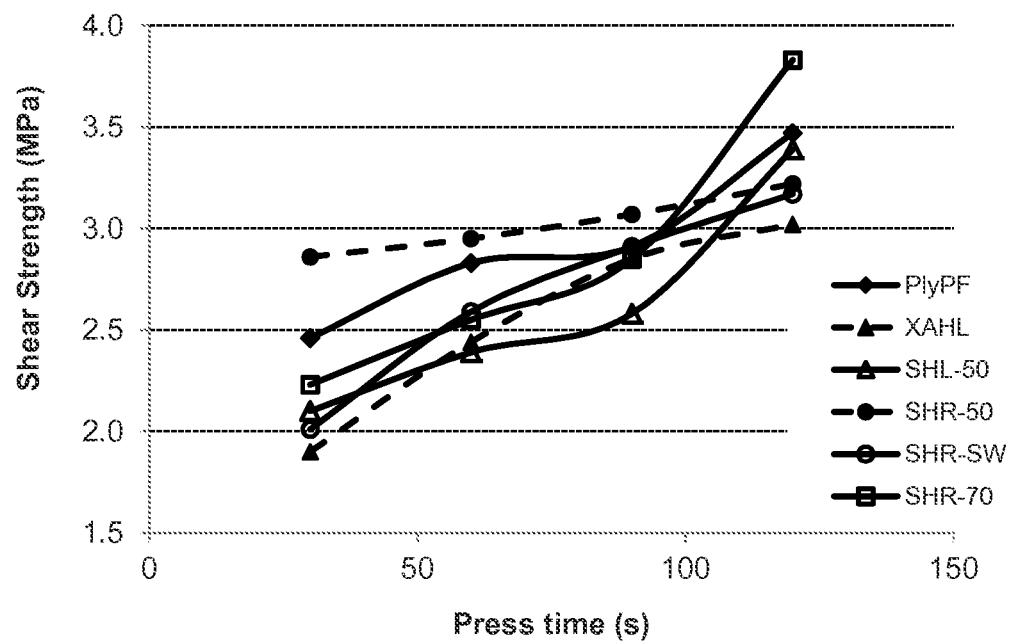
FIGS. 4-5 illustrate the cure speed for various phenol-formaldehyde (PF) resin mixtures, in which a portion of the plywood PF resin or oriented strand board (OSB) PE resin has been substituted with various materials (see Example 1). PF resin mixtures were prepared, substituting 30 wt. % of the plywood PF resin (FIG. 4), and 30 wt. % of the OSB PF resin (FIG. 5), with the indicated material, the latter comprising lignin and/or type II cellulose.
Figure 5:
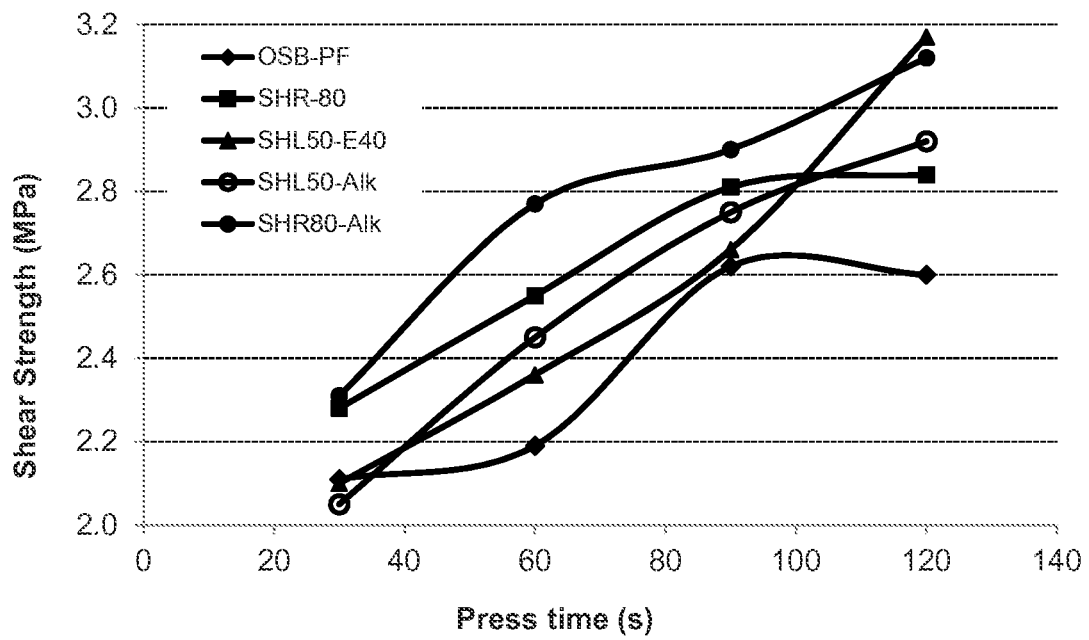

The cure speed (at selected PF replacement levels) indicates how fast the resin cured, and this is an important characteristic to predict the productivity of the industrial process equipment, the hot press specifically (for example, to form laminates), which could be a bottleneck at a mill. FIGS. 4-5 report cure speed data (shear strength as a function of press time). The cure speed test was performed at 120° C. at selected press time points.

Results and Discussion

Bondability and cure speed tests were conducted to evaluate adhesive performance of the cellulose and/or lignin/PF resin mixtures at different substitution levels. The data were compared with commercial plywood and OSB resins used as the reference.

The results show (FIGS. 4-5) that various types of the test samples in different forms (dry, alkaline solution, alkaline slurry) can successfully replace a portion of PF resins in plywood and OSB adhesive glue mixes ("PlyPF" is the control plywood PF resin, and "OSB-PF" is the control OSB PF resin). XAHL was less successful at higher substitution ratios (above 30%) as well as SHR-SW in the ease of plywood glue. For OSB replacement test, SHR performed well, whereas XAHL performed poorly and failed at the substitution level of above 20%. Interestingly, the phenolic content of XAHL is notably higher than the phenolic content of the lignin in most of the other samples (see Table 2), even though higher phenolic content is conventionally thought in the art to improve the performance of lignins in adhesives.

In some embodiments, in order to improve miscibility of the materials with the PF resins, NaOH was added to the lignins/SHR to generate either a true solution or slurry. Moreover, addition of alkali to the samples significantly improved cure speed of OSB PF/cellulose-lignin mixtures (FIG. 4).

Example 2

This example demonstrates performance of plywood samples produced using a commercial PF glue mix, in which certain proportions of components of the glue mix have been replaced with SHR-80 from Example 1.

The plywood samples were constructed from ⅛" Douglas Fir veneer, 15"×15", 3-ply, glue spread rate of 32 lbs/MSF single glueline, press pressure of 185 psi, press temperature of 150° C., assembly time of 20 min, press time of 3 min and 4 min, and all measurements were performed in replicates of three. The glue mix employed was prepared using a commercial softwood plywood liquid PF resin having 44% solids, along with the various additives, including flours (e.g., corncob and/or wheat) and soda ash. A portion of the PF resin nd additives component on a solids basis was replaced with SHR-80 in amounts as follows: 0% (control), 10% PF and 10% additives (10% R), and 20% PF and 20% additives (20% R). Additionally, in a fourth sample, 10% of the PF resin on a solids basis, as well as all additives, were replaced with SHR-80 (10% PF and all additives), For example, considering a 1 kg sample of the commercial PE resin, the four samples contain:

Control: 0.7 kg PF+0.3 kg additives
10% R: 0.63 kg PF+0.27 kg additives+0.10 kg SHR-80
20% R: 0.56 kg+0.24 kg additives+0.20 kg SHR-80
10% PF and all additives: 0.63 kg PF+zero additives+0.37 kg SHR-80

Plywood panels were stored for one week before cutting and testing. Thirty-two specimens were cut from each panel for testing the bond performance according to CSA Standard O151-04, hereby incorporated by reference in its entirety.

Lathe checks were in the open configuration when preparing half of the 32 specimens (the O specimens), and lathe checks were in the closed configuration when preparing the other half of the 32 specimens (the C specimens). Eight specimens each of the O specimens and C specimens were treated with the vacuum/pressure water soak cycle (Table 8) and eight specimens each of the O specimens and C specimens were subjected to the boil-dry-boil cycle (Table 9) conditions prior to the shear test, according to the CSA standard. The shear test was conducted using a plywood shear testing machine when the specimens were still wet. The shear strength and wood failure percentage were recorded for each specimen. The average shear strength and wood failure percentage were obtained from all specimens, as measured according to CSA Standard 0151-04 and ASTM D 5266-13. The results are shown in Table 8 and Table 9. The numbers in parentheses represent standard deviations.

TABLE 8

Shear test results of plywood panels after vacuum/pressure treatment

| Glue mix | Press time (s) | Shear Strength (psi) | Wood failure (%) |
|---|---|---|---|
| Control | 180 | 128 (44) | 79 (18) |
|  | 240 | 123 (42) | 85 (15) |
| 10% R | 180 | 120 (49) | 74 (18) |
|  | 240 | 121 (46) | 87 (9) |
| 20% R | 180 | 129 (35) | 78 (17) |
|  | 240 | 130 (42) | 84 (8) |
| 10% PF and all additives | 180 | 124 (46) | 63 (23) |
|  | 240 | 130 (52) | 91 (9) |

TABLE 9

Shear test results of plywood panels after boil-dry-boil treatment

| Glue mix | Press time (s) | Shear Strength (psi) | Wood failure (%) |
|---|---|---|---|
| Control | 180 | 126 (50) | 91 (10) |
|  | 240 | 116 (45) | 91 (10) |
| 10% R | 180 | 120 (45) | 83 (15) |
|  | 240 | 116 (44) | 89 (11) |
| 20% R | 180 | 118 (31) | 83 (14) |
|  | 240 | 124 (35) | 87 (9) |
| 10% PF and all additives | 180 | 124 (37) | 64 (26) |
|  | 240 | 111 (47) | 92 (7) |

As can be observed, the glue mixes showed strong bonding strength and strong water durability (Table 8) and resistance to accelerated aging (Table 9). The reactivity of the glue mix containing the solid residue (containing type-II cellulose) of lignocellulosic biomass processing was maintained at a level comparable to the commercial glue mix when SHR-80 was used at a level of 10% or 20% substitution of glue mix solids. The results demonstrate that solid residue (containing type-II cellulose) of lignocellulosic biomass processing can be a viable product and a major ingredient in wood adhesives for the manufacture of exterior grade plywood and OSB, as well as other engineered wood products.

Example 3

This example compares the performance of plywood phenol-formaldehyde (PF) wood adhesives containing SHR-50 (i.e., type-II cellulose and lignin) in accordance with an embodiment of the invention, with otherwise identical plywood PF wood adhesives containing lignins derived from other processes (e.g., Kraft. Alcell, etc.) and which do not contain type-II cellulose. The performance was measured using the ABES system, similar to that described in Example 1.

The inventive composition included SHR-50 described in Example 1. The comparative lignins employed were aspen soda (AS1), birch kraft (BK1), Douglas Fir organosolv (DFO), Pine soda (PS2), Alcell hardwood organosolv (RP), soda grass (SG), and softwood pine kraft (SR).

Admixtures of PF and SHR, or PF and comparative lignins, were preparedto achieve an admixture having an overall solids content between 38 wt. %. The lignins and lignin/cellulose residues were added at a PF replacement level of 30% based on PF resin solids; NaOH at 10% wt/wt based on dry weight of the SHR/lignin residue, and the additions were made in the following order: (i) lignin/SHR residue, (ii) NaOH as a 25% solution, (iii) PF resin and water. A control was also tested, which was a plywood PF resin having a solids content of 38 wt. % (PF-2-38%). All samples except the control contained 10 wt. % sodium hydroxide.

Figure 6:
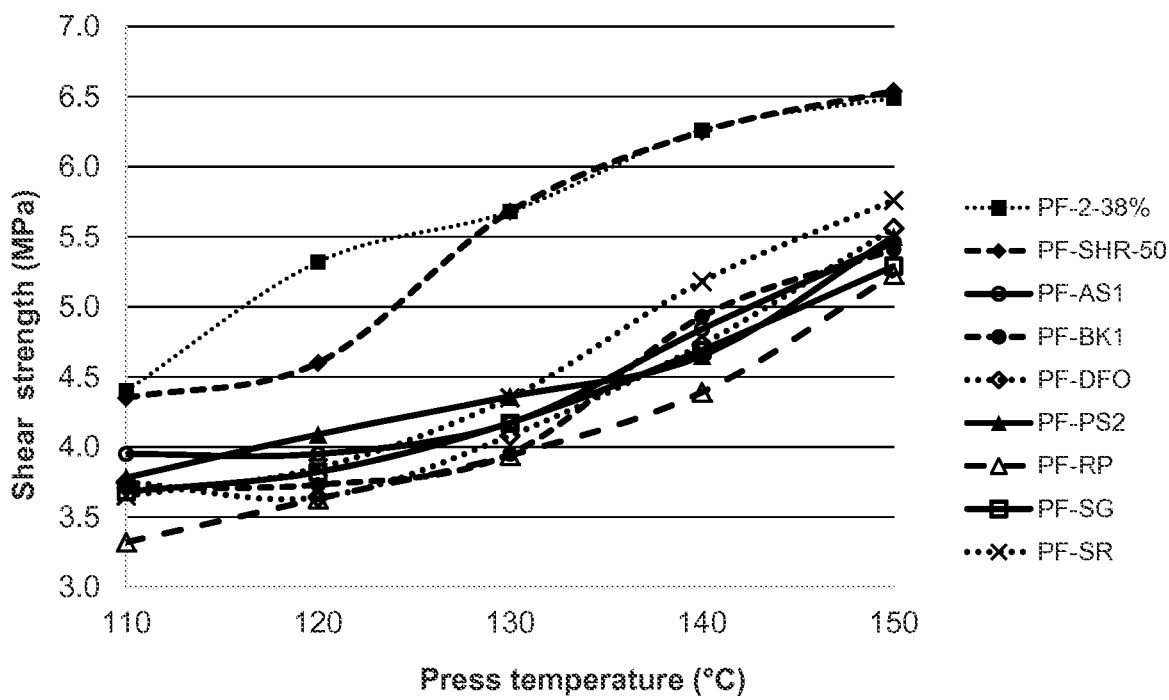
FIG. 6 compares the performance of plywood PF wood adhesives containing SHR-50 (i.e., type-II cellulose and lignin) in accordance with an embodiment of the invention, with otherwise identical plywood PF wood adhesives containing lignins derived from other processes (e.g., Kraft, Alcell, etc.) and which do not contain type-II cellulose (see Example 3).

Sliced maple veneers were conditioned at 50% relative humidity and 20° C. and then cut into strands of 117 mm×20 mm×0.7 mm and used for the ABES test. The resulting admixtures were applied to the conditioned sliced maple strands to form a bonding area of 20 mm×5 mm, and the bonds cured at a designated temperature (110° C. to 150° C.), for a press time of 90 sec, at a press pressure of 2 MPa. Immediately after each bond is cured, the bonded wood sample was tested to destruction in shear mode. Tensile load was monitored digitally during bond pulling and shear stress-to-failure (area-corrected peak load) was calculated. Five replicates were performed for each press condition. The results are shown in FIG. 6.

At least at the higher press temperatures, the data show that the inventive PF-SHR-50 sample (comprising both lignin and type cellulose) has comparable performance to the two PF controls, and that these three samples significantly outperform all of the comparative technical lignin samples. Again, the type II cellulose provides improved performance in these PF wood adhesives.

Example 4

Figure 7:
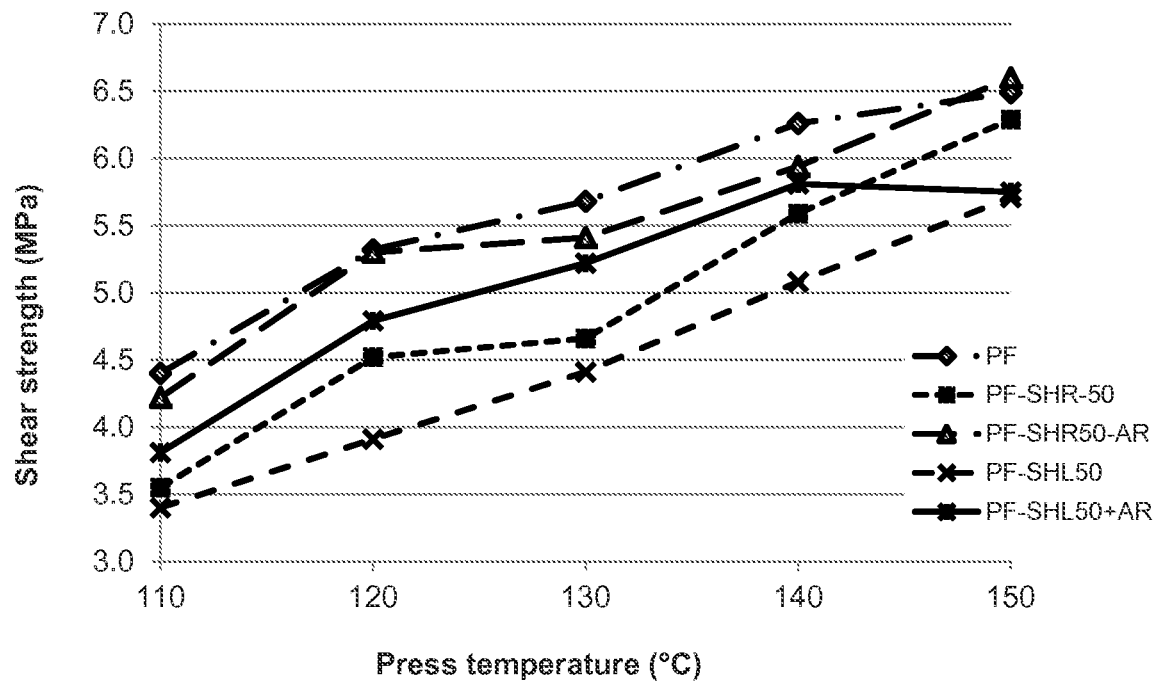
FIG. 7 compares the performance of plywood PF wood adhesives containing SHR-50, and SHR-50–AR (each containing type-II cellulose and lignin) in accordance with some embodiments of the invention, with otherwise identical plywood PF wood adhesives containing lignins that have been purified from SHR-50 (i.e., SHL-50) (see Example 4).

This example compares the performance of plywood phenol-formaldehyde (PF) wood adhesives containing SHR-50 (e.g., containing type-II cellulose and lignin) and SHR-50–AR (solids remaining after extracting lignin from SHR-50, which solids are mostly cellulose, such as type-II cellulose) in accordance with some embodiments of the invention, with otherwise identical plywood PF wood adhesives containing lignins that have been purified from SHR-50 (i.e., SHL-50) and a combination of SHL-50 and SHR-50–AR (i.e., "SHL-50+AR", which is an attempt to re-make SHR-50 prior to lignin extraction). Preparation of the SHR, SHL, and AR samples is described in Example 1, except the preparations in this example also contained 10 wt. % NaOH on a dry basis (based on the dry weight of lignin/cellulose residue). SHL-50+AR was prepared by simply blending SHL-50 and SHR-50–AR residues in the same proportions (by weight of solids) as obtained from the original SHR. The PF replacement level was 30%, and the order of mixing was: (i) PF resin (ii) lignin/cellulose residue, (iii) 10 wt. % NaOH based on dry lignini/cellulose residue (added as a 25% by weight NaOH solution). A control PF resin was also tested ("PF"), which does not contain any lignin or cellulose. The performance of these adhesives was measured using the ABES system, similar to that described in Examples 1 and 3. The results are depicted in FIG. 7.

The sample for which the replacement component is closest to representing "pure" lignin, PF-SHL-50 (SHL-50 is ~1% cellulose) is the weaker performing sample. The PF-SHR-50 sample, where the replacement component comprises lignin and type II cellulose (having lignin:cellulose ratios of 56:44) shows performance close to that of the PF control resin. And the sample comprising predominantly type II cellulose, PF-SHR-50-AR, (with a lignin:cellulose ratio of 16:76) provides the best performance, marginally outperforming the PF control. Although other factors may have an effect (e.g. molecular weight and crystallinity of the cellulose, etc.), the observed adhesive performance is correlated with the relative proportion of the type II cellulose content substituted into the PF resin adhesive.

Example 5

Figure 8:
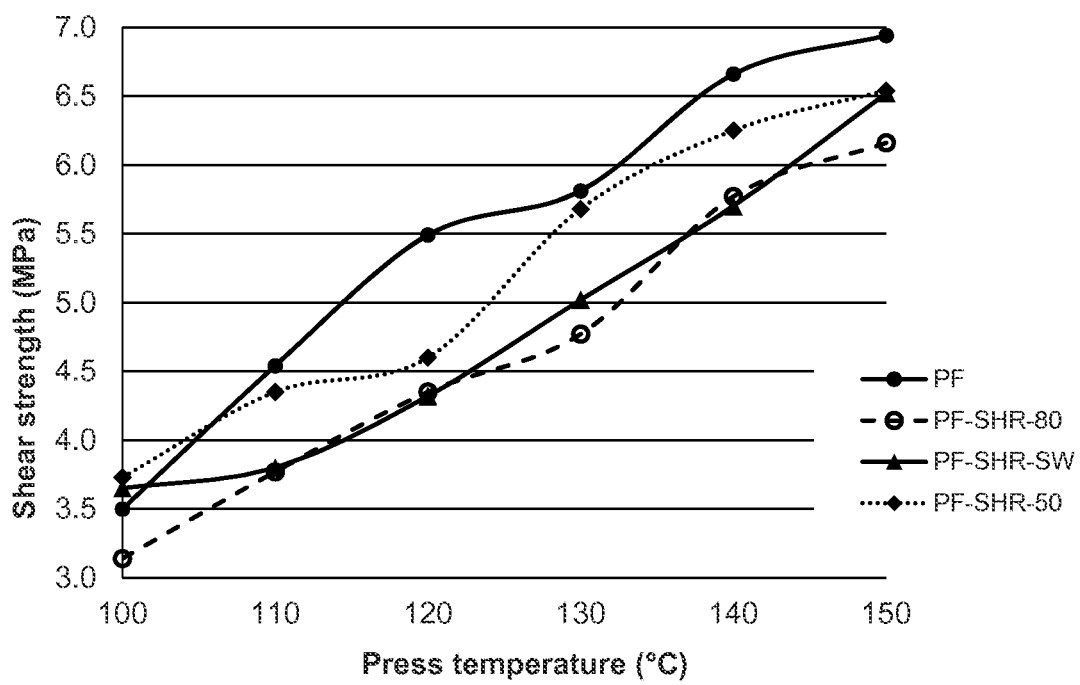
FIG. 8 compares the performance of plywood PF wood adhesives containing lignin and type-II cellulose derived from hardwood (SHR-50 and SHR-80) with plywood PF wood adhesives containing lignin and type-II cellulose derived from softwood (SHR-60-SW) (see Example 5).

This example compares the performance of plywood phenol-formaldehyde (PF) wood adhesives containing lignin and type-II cellulose derived from hardwood (SHR-50 and SHR-80) with plywood phenol-formaldehyde (PF) wood adhesives containing lignin and type-II cellulose derived from softwood (SHR-60-SW). The lignin/cellulose residues are added at a 30% level of PF resin replacement. A control plywood PF resin without any added lignin or cellulose was also tested. The performance of these adhesives was measured using the ABES system, similar to that described in Examples 1 and 3. Preparation of the SHR samples is described in Example 1, except the preparations in this example also contained 10 wt. % NaOH on a dry basis (based on the dry weight of lignin/cellulose residue), and the order of addition was: (i) PF resin, (ii) lignin/cellulose residue, (iii) 10 wt. % NaOH (added as a 25% by weight solution). The results are depicted in FIG. 8.

The data imply that the soft wood derived residue (63.8 lignin: 30.2 cellulose) has a comparable performance to the hard wood derived residues.

Example 6

This example compares the performance of a commercially obtained plywood phenol-formaldehyde (PF) adhesive resin admixed with various residues (SHR-50, SHR-70 and SHR-60-SW) comprising lignin and type-II cellulose derived from hardwood (or softwood, in the case of SHR-60-SW) at various levels of resin replacement (10 wt. %, 20 wt. %, 35 wt. %, and 45 wt. % replacement). A control OSB PF resin (0 wt. %), i.e. without any resin being replaced with lignin or cellulose, was also tested. The performance of these adhesives was measured using the ABES system, similar to that described in Examples 1 and 3. Preparation of the samples is described in Example 1, except the preparations in this example also contain 10 wt. % NaOH (based on the dry weight of SHR-XX residue), and the order of addition was: (i) PF resin, (ii) SHR-XX, (iii) 10 wt. % NaOH (added as a 25% by weight solution). The results are shown in Table 10, below.

TABLE 10

Shear test results (MPa) for plywood panels for various PF Replacement Levels

| PF resin substitution | XAHL | | SHR-50 | | SHR-70 | | SHR-SW | |
|---|---|---|---|---|---|---|---|---|
| % | AVE | STD | AVE | STD | AVE | STD | AVE | STD |
| 0 | 6.49 | 0.62 | 6.49 | 0.62 | 6.49 | 0.62 | 6.49 | 0.62 |
| 10 | 5.73 | 0.56 | 6.94 | 0.91 | 6.91 | 1.3 | 6.96 | 1.07 |
| 15 | 6.24 | 0.75 | 6.99 | 0.82 | 6.67 | 0.78 | 6.20 | 0.37 |
| 20 | 5.82 | 0.35 | 5.82 | 0.78 | 6.42 | 0.71 | 6.35 | 0.98 |
| 30 | 6.28 | 0.22 | 6.62 | 0.56 | 6.69 | 1.18 | 6.66 | 0.86 |
| 35 | 5.40 | 0.19 | 6.26 | 0.38 | 6.03 | 0.77 | 5.89 | 0.26 |
| 45 | 5.52 | 0.29 | 6.15 | 0.25 | 5.83 | 0.29 | 5.74 | 0.42 |

The PF-SHR-XX performs well at a substitution level of up to 30%; notably, better than the control PF resin at levels of 10% and 15% PF replacement. However, further replacement (to 35% and 45% substitution levels) results in progressively lower performance. Again, the hard wood derived residues (SHR-50 and SHR-70) are comparable to the residue derived from soft wood biomass (SHR-60-SW). As noted earlier (Example 1), the performance of XAHL is generally poorer.

Example 7

Figure 9:
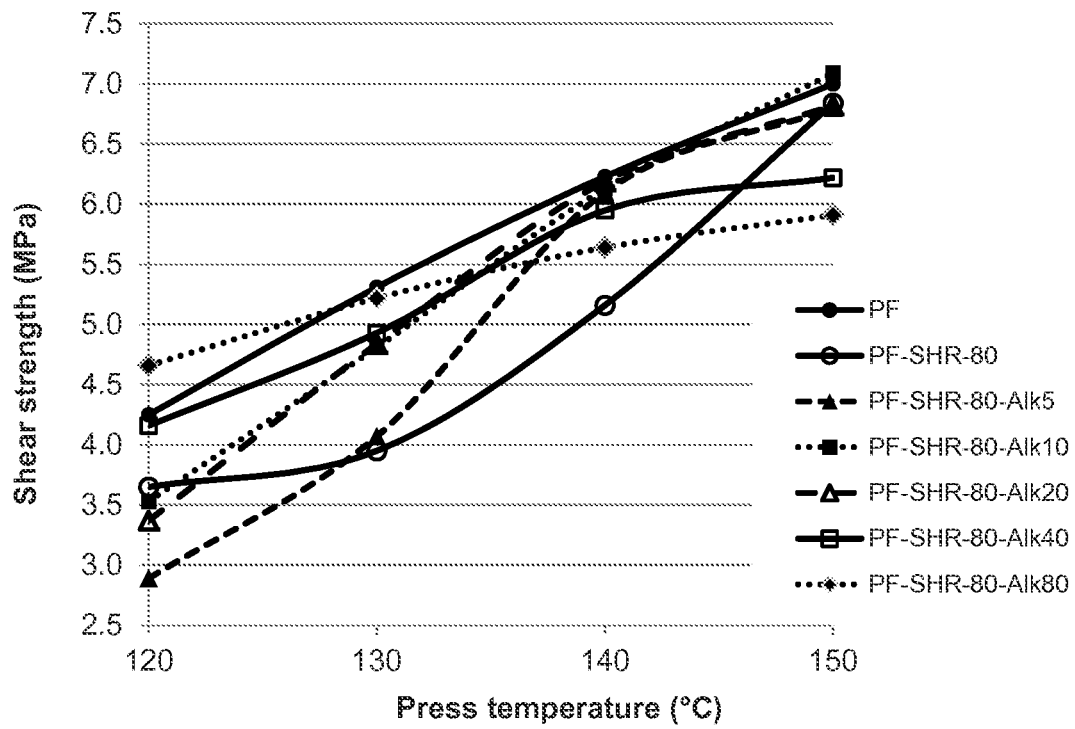
FIG. 9 compares the performance of a commercially obtained OSBPF wood adhesive admixed with residue (SHR-80) comprising lignin and type-II cellulose derived from hardwood at various levels of alkali (NaOH) addition (see Example 7).

This example compares the performance of a commercially obtained oriented strand board (OSB) phenol-formaldehyde (PF) wood adhesive admixed with residue (SHR-80) comprising lignin and type-II cellulose derived from hardwood at various levels of alkali (NaOH) addition (PF-SHR-80-AlkX, where "X" indicates weight percent of alkali based on the dry weight of SHR-80 residue). Lignin/cellulose material was employed in the OSB PF resin at a replacement amount of 30 wt. % in all admixtures except the two controls, A control OSB PF resin (0 wt. %) without any resin being replaced or any alkali addition was also tested (PF), as was a control resin with 30 wt. % resin replaced but without the addition of alkali (PF-SHR-80). The performance of these adhesives was measured using the ABES system, similar to that described in Examples 1 and 3. Preparation of the SHR-80 and the blending protocol is described in Example 1, and the order of addition was: (i) SHR-80, (ii) 10 wt. % NaOH (added as a 25% by weight solution), and then add the combination to (iii) PF resin. The results are depicted in FIG. 9. Addition of NaOH in all of these PF adhesive formulations aids in decreasing the viscosity of the formulation. Without wishing to be bound by theory, it is believed that the performance of OSB resins is more affected by alkali addition compared to plywood resins (see Example 8 below), because commercial plywood resins (pH around 13.5) are already at a higher pH than the commercial OSB resins (pH around 10.5).

Example 8

Figure 10:
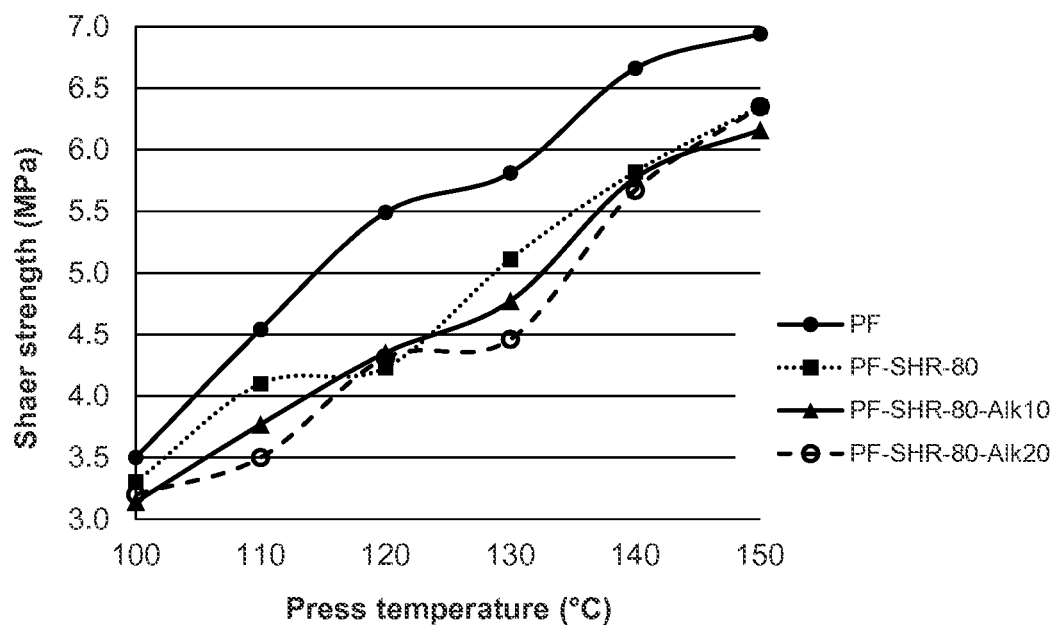
FIG. 10 compares the performance of a commercially obtained plywood PF wood adhesive admixed with residue (SHR-80) comprising lignin and type-II cellulose derived from hardwood at various levels of alkali (NaOH) addition (see Example 8).

This example is similar to Example 7, except that a commercially obtained plywood phenol-formaldehyde (PF) wood adhesive is employed instead of an OSB resin. The plywood PF resin is admixed with residue (SHR-80) comprising lignin and type-II cellulose derived from hardwood at various levels of alkali (NaOH) addition (PF-SHR-80-AlkX, where "X" indicates weight percent of alkali based on the dry weight of SHR-80 residue). Lignin/cellulose material was employed in the plywood PF resin at a replacement amount of 30 wt. % in all admixtures except the two controls. A control plywood PF resin (0 wt. %) without any resin being replaced or any alkali addition was also tested (PF), as was a control resin with 30 wt. % resin replaced but without the addition of alkali (PF-SHR-80). The performance of these adhesives was measured using the ABES system, similar to that described in Examples 1 and 3. Preparation of the SHR-80 and the blending protocol is described in Example 1, and the order of addition was: (i) SHR-80, (ii) 10 wt. % NaOH (added as a 50% by weight solution), and then add the combination to (iii) PF resin. The results are depicted in FIG. 10.

The addition of alkali at the 10% and 20% level to the PF-SHR-80 sample has little or no effect compared to the performance observed for PF-SHR-80 without alkali. As indicated above, this may be because commercial plywood PF resins are supplied at high pH (around 13.5).

Example 9

This example demonstrates the preparation and performance of an adhesive resin that has been prepared by condensing ("cooking") formaldehyde and at least one phenolic compound (phenol and/or lignin) in the presence of type-II cellulose to form an adhesive resin.

The procedure is as follows: Using a water bath at 70° C., 200 g phenol was melted and 193.9 g of the molten phenol transferred (via a 105° C. pre-heated hot beaker and glass funnel) into a flask; stirring was started and the temperature maintained at 50° C. 83.1 g cellulose, lignin or cellulose/lignin residue was added over 20-30 min: then 108 g water, and then 33.12 g 50% sodium hydroxide solution was added. A further 10.18 g water was added after 15 min at 50° C. A first portion of 37% aqueous solution of formaldehyde (245.26 g) was added over 10 min, at 45-50° C., after which the temperature was raised and maintained at 65° C. for 15 min, with continuous stirring. A second portion of 37% formaldehyde solution (122.63 g) was added over 10 min, at 65° C. and maintained at temperature for 10 min. 33.12 g 50% sodium hydroxide solution was added and the temperature slowly raised to 85° C., over 20 min. A further 44.16 g 50% sodium hydroxide solution and 122.95 g water was added and the temperature adjusted to 80° C. The total reaction time at 80° C., after the addition of all reagents, was 6 h50 min. The mixture was cooled (using a cold water bath) to 25° C. The resin was transferred to a container and the viscosity measured at 25° C. The pH, gel time, % non-volatiles and % NaOH were determined.

Figure 11:
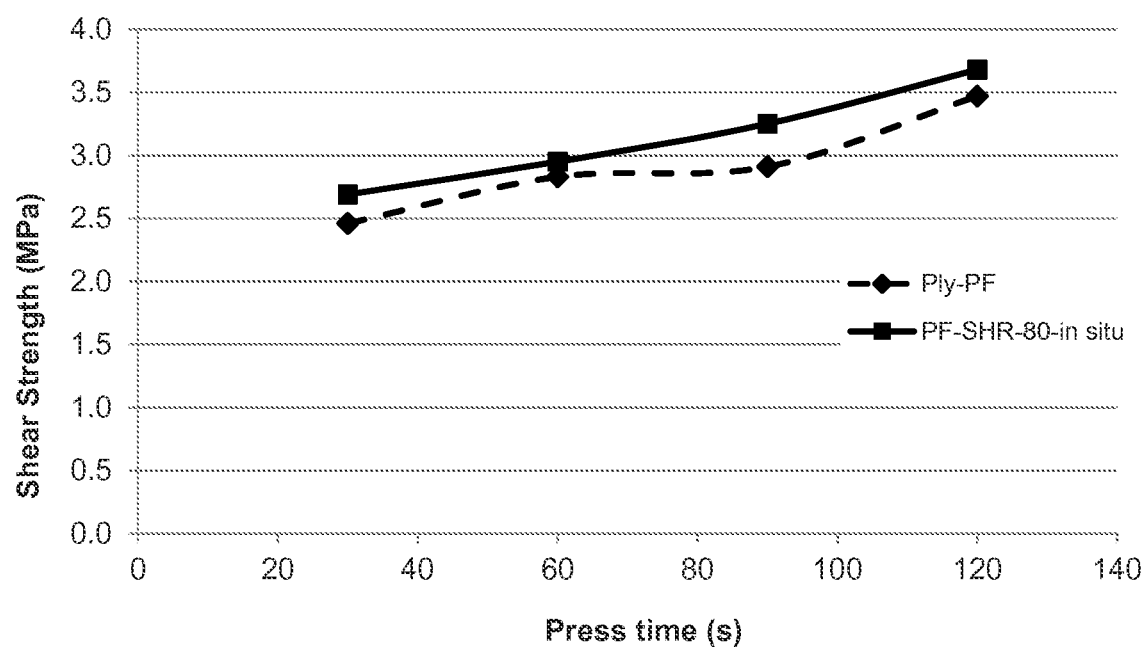
FIG. 11 illustrates the cure speed for a PF resin mixture, in which a portion of the plywood PF resin has been substituted (30% replacement of the PF resin) with a residue comprising lignin and type II cellulose, and wherein the lignin/llulose residue is added during the formation of the PF resin by condensation of phenol and formaldehyde. The cure speed, as measured by adhesive performance, is compared to that for the same PF resin wherein the control does not have any resin replaced (see Example 9).

FIG. 11 shows the cure speed (Shear Strength plotted against Time) for an in-situ preparation of a modified PF resin prepared (polymerized) in the presence of a lignin/cellulose resin (SHR-80), such that the proportion of reactants equates to a formal 30% replacement of the PF resin with SHR-80. The cellulose modified PF resin (PF-SHR-80-in situ) prepared via the in-situ polymerization has the same cure speed as the control PF resin and equal or better adhesive performance in terms of the observed shear strength at 120° C.

Example 10

This example demonstrates performance of oriented strand board (OSB) samples produced using a commercial PF resin (57% solids content) in which certain proportions of the resin have been replaced with an alkaline slurry of air-dried SHR-80 from Example 1.

The alkaline slurry of SHR-80 was prepared by mixing air-dried SHR-80 with water and sodium hydroxide (5% relative to SHR-80 on a solids on solids basis) to form SHR-80-Alk slurry, and then diluted with water to give a 30% solids content. The OSB panels were made in a 3-layer structure with a face-core-face weight ratio of 25:50:25, using the following procedures.

The surface strands (aspen strands) for the OSB were combined with each sample shown in Table 11 at a resin solids loading rate for both face layers of: 4% PF resin for control OSB panels (Samples 1 and 4); 3% PF and 1% SHR-80/NaOH (25% PF replacement with alkaline SHR-80, Samples 2 and 5); and 2.4% PF with 1.6% SHR-80/NaOH (40% PF replacement with alkaline SHR-80, Samples 3 and 6) for experimental OSB panels. The resin for the core layer in all control and experimental OSB panels was pMDI at a 2% solids add-on level (on a dry wood weight basis). Core strands were combined with a commercial fast cure pMDI resin at alevel of 2.0% solids basis (on a dry wood weight basis). The resins were applied in a drum blender with a spinning disk atomizer at 10,000 to 15,000 rpm for the surface and core layers. Surface resins were applied between 20° C.-30° C. Commercial emulsion wax was applied to the surface and core strands at a level of 1.0% solids (on a dry wood basis) in a drum blender with a spinning disk atomizer at 4000 to 9000 rpm. Moisture content of the blended strands was targeted at 6.5% for the surface and 4.0% for the core. The blended materials were then manually formed into randomly oriented mats measuring 86 cm×86 cm (34 in.×34 in.) with a 50/50 surface to core weight ratio. Pressed panels were targeted for a density of 609 kg/m³ (38 lb/ft³) and a thickness of 11.1 mm (0.44 in.). The press temperature was 215° C. (419° F.). Three panels from each binder application were then pressed for 150 sec and a second set of three panels were pressed for 180 sec. All panels were hot stacked for 24 hours. The key test parameters and results are listed in Table 11.

The physical and mechanical properties of the 86 cm×86 cm (34"×34") OSB panels produced were tested according to ASTM D 1037-06a and CSA O437.2-93, herein incorporated by reference in their entirety. The property parameters included static bending modulus of elasticity (MOE) and modulus of rupture (MOR), internal bond (IB), 24-hour soak thickness swell (TS), and water absorption (WA). The results are shown below in Table 11.

TABLE 11

Properties of OSB Panels

| Sample | PF Resin Substitution (%) (Commercial Target) | Press Time (s) | Static Bending MOE (MPa) (>3100) | Static Bending MOR (MPa) (>17.2) | Internal Bond (Mpa) (>0.345) | Thickness Swell 24 Hour soak Thickness Swell (%) (<25) | Thickness Swell 24 Hour soak Water Absorption (%) (NA) |
|---|---|---|---|---|---|---|---|
| 1 | 10 | 150 | 4100 | 24.5 | 0.403 | 14.3 | 27.4 |
| 2 | 25 | 150 | 4500 | 25.7 | 0.345 | 15.2 | 28.9 |
| 3 | 40 | 150 | 3900 | 25.6 | 0.389 | 16.5 | 31.1 |
| 4 | 0 | 180 | 3900 | 22.8 | 0.448 | 13.3 | 25.0 |
| 5 | 25 | 180 | 4400 | 25.7 | 0.391 | 14.1 | 27.2 |
| 6 | 40 | 180 | 3700 | 24.5 | 0.410 | 13.7 | 28.5 |

The PF control resin shows a similar performance profile at the two press times, 150 s and 180 s, indicating that the PF control resin has cured completely at 150 s press time.

The majority of the samples show a performance profile that is close to that of the commercial PF resin controls, and surpasses the commercial test requirements in all areas.

Accordingly, the inventive wood adhesive compositions described herein are viable materials to partially replace PF face resin in OSB and plywood industrial manufacturing.

While the preferred forms of the invention have been disclosed, it will be apparent to those skilled in the art that various changes and modifications may be made that will achieve some of the advantages of the invention without departing from the spirit and scope of the invention. Therefore, the scope of the invention is to be determined solely by the claims to be appended.

When ranges are used herein for physical properties, such as temperature ranges and pressure ranges, or chemical properties, such as chemical formulae, all combinations, and sub-combinations of ranges and specific embodiments therein are intended to be included.

The disclosures of each patent, patent application, and publication cited or described in this document are hereby incorporated herein by reference, in their entirety.

What is claimed:

1. A wood adhesive comprising:
   an adhesive resin; and
   cellulose;
   wherein at least about 20 wt. % of the cellulose is type-II cellulose;
   and further comprising lignin.

2. The wood adhesive of claim 1 wherein the cellulose is present in an amount of about 20 wt. % to about 50 wt. % of the total composition on a dry basis.

3. The wood adhesive of claim 1, wherein the wood adhesive is formed by providing the lignin and the cellulose in the form of a residue and mixing the adhesive resin with the residue, wherein the residue is obtained by supercritical hydrolysis of biomass.

4. The wood adhesive of claim 1, wherein the wood adhesive is formed by providing the lignin and the cellulose in the form of a residue and mixing the adhesive resin with the residue wherein the residue is obtained by a process comprising:
   Subjecting size-reduced biomass to hydrothermal treatment at a temperature of about 140° C. to about 280° C., thereby forming a solids fraction;
   optionally, further size-reducing the solids fraction; and
   treating at least a portion of the solids fraction, which optionally has been further size reduced, with hot compressed water having a temperature of about 300° C. to about 550° C., thereby forming the residue.

5. A composition comprising an adhesive resin, wherein the adhesive resin comprises a condensation product of:
   formaldehyde; and
   at least one phenolic compound;
   wherein the condensation product is formed in the presence of cellulose and lignin;
   wherein at least about 20 wt. % of the cellulose is type-II cellulose.

6. The composition of claim 5, wherein at least one phenolic compound comprises lignin.

7. The composition of claim 6, wherein the cellulose is present in an amount of about 20 wt. % to about 80 wt. %, based on the total combined weight of the lignin and the cellulose, wherein the amounts are on a dry basis.

8. The composition of claim 6, wherein a residue comprising the lignin and the cellulose is present during the formation of the condensation product, and wherein the residue is obtained from supercritical hydrolysis of biomass.

9. The composition of claim 6, wherein a residue comprising the lignin and the cellulose is present during the formation of the condensation product, and wherein the residue is obtained from a process comprising:
   subjecting size-reduced biomass to hydrothermal treatment at a temperature of about 140° C. to about 280° C., thereby forming a solids fraction;
   optionally, further size-reducing the solids fraction; and
   treating at least a portion of the solids fraction, which optionally has been further size reduced, with hot compressed water having a temperature of about 300° C. to about 550° C., thereby forming the residue.

10. The composition of claim 5, wherein the at least one phenolic compound comprises phenol.

11. The composition of claim 5, wherein the total cellulose present is in an amount of about 5 wt. % to about 50 wt. %, based on the total combined weight of the formaldehyde, the at least one phenolic compound, and the total cellulose, wherein amounts are on a dry basis, and wherein the total cellulose includes type I cellulose, type II cellulose, and amorphous cellulose.

12. The composition of claim 5, wherein the composition is a wood adhesive.

13. Cured wood adhesive of claim 12.

14. Plywood or oriented strand board comprising the cured wood adhesive of claim 13.

15. A wood adhesive comprising:
   an adhesive resin; and
   cellulose;
   wherein at least about 20 wt. % of the cellulose is type-II cellulose; and
   wherein the cellulose is present in an amount of about 5 wt. % to about 50 wt. % of the total composition, on a dry basis.

16. Plywood or oriented strand wood comprising a cured wood adhesive comprising:
   an adhesive resin; and
   cellulose;
   wherein at least about 20 wt. % of the cellulose is type-II cellulose.

* * * * *